United States Patent
Aferzon et al.

(10) Patent No.: US 12,458,466 B2
(45) Date of Patent: Nov. 4, 2025

(54) FLEXIBLE AND TENSIONED CAMERA APPARATUS WITH ELECTRONIC MODULE SYSTEM FOR ENABLING MANEUVERABLE STEREOSCOPIC FIELD OF VIEW

(71) Applicant: Mantis Health, Inc., Stamford, CT (US)

(72) Inventors: Joshua Aferzon, Avon, CT (US); Lee Nicholson, Unionville (CA)

(73) Assignee: Mantis Health, Inc., Stamford, CT (US)

( * ) Notice: Subject to any disclaimer, the term of this patent is extended or adjusted under 35 U.S.C. 154(b) by 0 days.

(21) Appl. No.: 18/129,601

(22) Filed: Mar. 31, 2023

(65) Prior Publication Data

US 2023/0310111 A1    Oct. 5, 2023

Related U.S. Application Data

(60) Provisional application No. 63/326,826, filed on Apr. 2, 2022.

(51) Int. Cl.
  *A61B 90/00*    (2016.01)

(52) U.S. Cl.
  CPC .................. *A61B 90/361* (2016.02)

(58) Field of Classification Search
  CPC ......... H04N 21/23892; H04N 21/2181; H04N 21/2353; H04N 21/23895
  See application file for complete search history.

(56) References Cited

U.S. PATENT DOCUMENTS

| | | | |
|---|---|---|---|
| 4,115,813 A * | 9/1978 | Mikami | H04N 1/1004 396/419 |
| 9,407,902 B1 * | 8/2016 | Cole | H04N 19/597 |
| 10,178,209 B1 * | 1/2019 | Hesse | H04N 23/54 |
| 10,885,716 B1 * | 1/2021 | Evertt | G06T 19/006 |
| 11,016,560 B1 * | 5/2021 | Wenger | G06F 3/011 |
| 2002/0085273 A1 * | 7/2002 | Ito | A61B 90/20 359/368 |
| 2005/0159842 A1 * | 7/2005 | Ban | B25J 19/023 702/150 |
| 2006/0213167 A1 * | 9/2006 | Koselka | A01B 51/026 56/10.2 A |
| 2012/0200592 A1 * | 8/2012 | Kimura | G09G 3/001 345/212 |
| 2012/0236002 A1 * | 9/2012 | Bi | G06T 15/30 345/427 |
| 2013/0010081 A1 * | 1/2013 | Tenney | H04N 13/20 348/47 |
| 2015/0085095 A1 * | 3/2015 | Tesar | A61B 34/20 359/613 |

(Continued)

*Primary Examiner* — Peter D Le
(74) *Attorney, Agent, or Firm* — Hoffmann & Baron, LLP

(57) ABSTRACT

An apparatus and method for enabling maneuverable stereoscopic field of view, the apparatus including a camera head configured to capture image data, an electronics module including, at least a processor and a memory communicatively connected to the at least a processor, wherein the memory contains instructions configuring the at least a processor to receive the image data from the camera head, process the image data, transmit stereoscopic video data. The apparatus further includes an articulating arm connecting the camera head to the electronics module.

20 Claims, 32 Drawing Sheets

(56) References Cited

U.S. PATENT DOCUMENTS

| | | | |
|---|---|---|---|
| 2015/0130699 A1* | 5/2015 | Cho | G02B 27/0172 |
| | | | 345/156 |
| 2017/0007351 A1* | 1/2017 | Yu | G02B 27/0172 |
| 2018/0220073 A1* | 8/2018 | Keal | H04N 23/683 |
| 2018/0295290 A1* | 10/2018 | Nakamura | G06F 1/1686 |
| 2019/0318622 A1* | 10/2019 | Shideler | G06V 10/147 |
| 2019/0327394 A1* | 10/2019 | Ramirez Luna | H04N 23/51 |
| 2022/0011576 A1* | 1/2022 | Shams | G06T 7/73 |
| 2022/0311989 A1* | 9/2022 | Terry | H04N 13/296 |
| 2022/0392111 A1* | 12/2022 | Sztuk | G06V 20/20 |
| 2023/0110248 A1* | 4/2023 | Faraji | A61B 34/30 |
| | | | 700/254 |
| 2023/0285089 A1* | 9/2023 | Manfrin | G16H 40/63 |
| | | | 606/1 |
| 2023/0294295 A1* | 9/2023 | Creusot | B25J 13/085 |
| | | | 700/258 |
| 2024/0005525 A1* | 1/2024 | Chumerin | G06T 7/70 |
| 2024/0377640 A1* | 11/2024 | Asaban | H04N 13/239 |

* cited by examiner

FLEXIBLE AND TENSIONED CAMERA APPARATUS WITH ELECTRONIC MODULE SYSTEM FOR ENABLING MANEUVERABLE STEREOSCOPIC FIELD OF VIEW

CROSS-REFERENCE TO RELATED APPLICATIONS

This application claims the benefit of priority of U.S. Provisional patent application Ser. No. 63/326,826, filed on Apr. 2, 2022, and titled "FLEXIBLE AND TENSIONED CAMERA APPARATUS WITH ELECTRONIC MODULE SYSTEM FOR ENABLING MANEUVERABLE STEREOSCOPIC FIELD OF VIEW," which is incorporated by reference herein in its entirety.

FIELD OF THE INVENTION

The present invention generally relates to the field of stereoscopic field of view. In particular, the present invention is directed to a flexible and tensioned camera apparatus with electronic module system for enabling maneuverable stereoscopic field of view.

BACKGROUND

While surgical microscopes offer powerful magnification and zoom capabilities, they are usually hundreds of pounds in weight and over six feet tall, making them difficult to maneuver. It is therefore desirable to provide a low-profile, easily maneuverable visualization device that can magnify the surgical site.

SUMMARY OF THE DISCLOSURE

In an aspect, an apparatus for enabling maneuverable stereoscopic field of view, the apparatus including a camera head configured to capture image data, an electronics module including, at least a processor and a memory communicatively connected to the at least a processor, wherein the memory contains instructions configuring the at least a processor to receive the image data from the camera head, process the image data, transmit stereoscopic video data, and an articulating arm connecting the camera head to the electronics module.

In another aspect, a method for enabling maneuverable stereoscopic field of view, the method including receiving image data from a camera head, transmitting the image data to an electronic module, wherein the electronics module is configured to process the image data, and transmit stereoscopic video data to a head-worn visualization system.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for capturing stereoscopic digital video data from one or more cameras connected to a low-profile articulating arm, and transmits it digitally to a remote display, enabling a maneuverable stereoscopic field of view without the bulk and disruptiveness associated with current microscope devices.

Aspects of the present disclosure may include an apparatus including a camera head connected to a flexible arm, wherein the flexible arm has a proximal aperture, a distal aperture, and an internal cavity extending through its entire length. A plurality of camera data cables and a plurality of LED power cables may extend through the camera head to the flexible arm proximal aperture, then continues through the internal cavity of the flexible arm, and then exits through the flexible arm distal aperture.

Aspects of the present disclosure may allow for a distal aperture to be connected to an electronics module, wherein the electronics module has a flexible arm receiver, a base plate, a plurality of base plate holes, a plurality of rail clamps, a box cover, a central processing unit, a graphics processing unit, a random access memory, a solid state or hard disk storage device, a wireless signal transmitter, a Bluetooth transmitter, a light source, power relay module, a plurality of signal outputs, and a plurality of signal inputs. Exemplary embodiments illustrating aspects of the present disclosure are described below in the context of several specific examples.

Figure 1A:
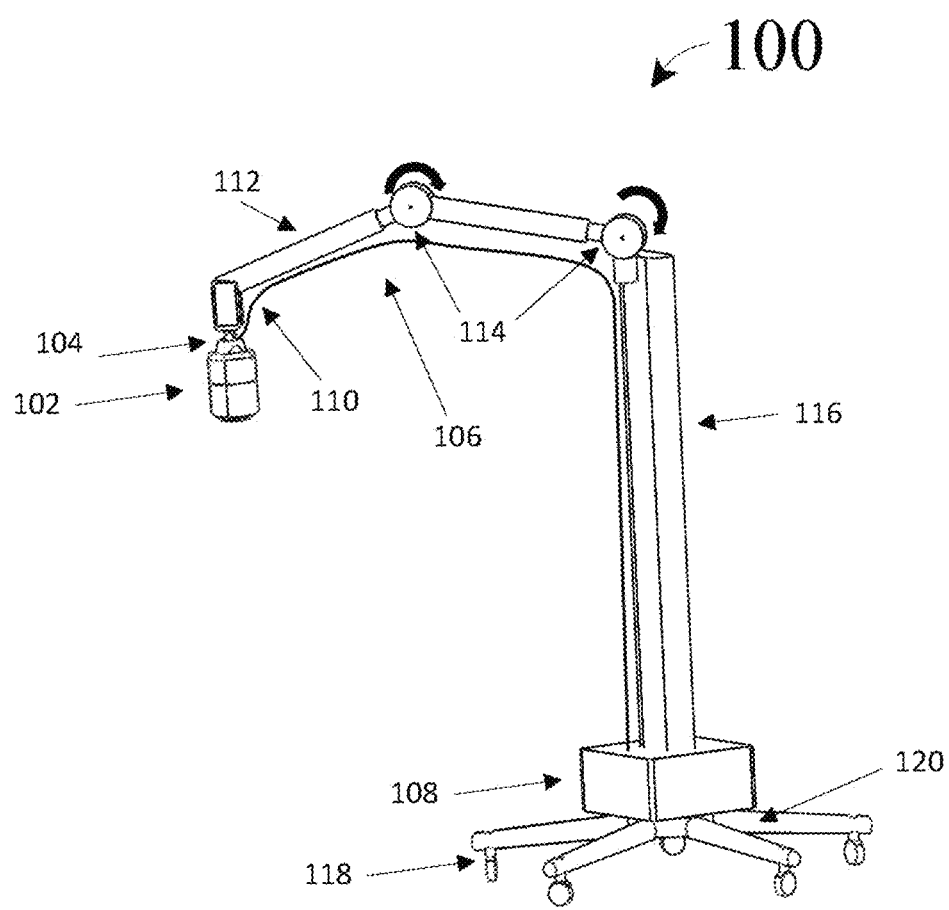
FIG. 1A illustrates exemplary embodiment of an apparatus for enabling maneuverable stereoscopic field of view.

Referring now to FIG. 1A, an exemplary embodiment of an apparatus 100 for enabling maneuverable stereoscopic field of view is illustrated. A "stereoscopic field of view," as used herein, is a field of view that uses binocular vision. Enabling a stereoscopic field of view may include "stereoscopy," which as used herein, is a technique for creating or enhancing the illusion of depth in an image by means of stereopsis for binocular vision. Apparatus 100 includes an electronics module 108 that is attached to an articulating arm 106. An "electronics module," as used herein, is set of computer components working in tandem, as disclosed further below. An "articulating arm," as used herein, is a jointed instrument or positioning device used in imaging procedures. Articulating arm 106 is further attached to a camera head 102 that is directed at an object of interest. A "camera," as used herein, is a device that is configured to sense electromagnetic radiation, such as without limitation visible light, and generate an image representing the electromagnetic radiation. In some cases, a camera may include one or more optics. Exemplary non-limiting optics include spherical lenses, aspherical lenses, reflectors, polarizers, filters, windows, aperture stops, and the like. In some cases, at least a camera may include an image sensor. Exemplary non-limiting image sensors include digital image sensors, such as without limitation charge-coupled device (CCD) sensors and complimentary metal-oxide-semiconductor (CMOS) sensors, chemical image sensors, and analog image sensors, such as without limitation film. An object of interest may include the object being captured by camera head 102. A "camera head," as used herein, is a housing apparatus of one or devices involved in capturing image data. Camera head 102 may house camera, transmission cables, processing units, and the like as described throughout this disclosure. For example, an object of interest may be a patient laying down of a surgical table with camera head 102 hanging overhead. Articulating arm 106 and camera head 102 may be made from a material such as a polymer, metal, ceramic, or composite thereof.

Still referring to FIG. 1A, articulating arm 106 may include a gas-spring arm with one or more pistons 112, wherein each position is connected by a rotatable joint 114. Rotatable joints, as described through this disclosure may include swivel joints, revolute joints, cylindrical joints, prismatic joints, mechanical joints and the like. A "gas spring," as used herein, is a type of spring that, unlike a typical mechanical spring that relies on elastic deformation, uses compressed gas contained within an enclosed cylinder sealed by a sliding piston to pneumatically store potential energy and withstand external force applied parallel to the direction of the piston shaft. A "piston," as used herein, is a solid cylinder or disk that fits snugly into a larger cylinder and moves under pressure. Articulating arm 106 may connect to camera head 102 using a rotatable joint as described above. Articulating arm 106 may connect to camera head 102 using a ball-and-socket joint 104. A "ball-and-socket joint," as used herein, is a type of coupling consisting of a ball-shaped part that fits into a ball-shaped socket. Ball-and-socket joint 104 may provide the ability of camera head 102 to spin. Apparatus 100 may include a backbone 116 connecting articulating arm to electronic module 108. A "backbone," as used herein, is a supporting structure. For example, backbone 116 may include a support beam. Backbone 116 may be made from a material such as a polymer, metal, ceramic, or composite thereof. Apparatus 100 may include one or more data cables 110 configured to transmit data from camera head to electronics module 108, for example and with reference the plurality of embodiments as described further below. In some embodiments, apparatus 100 may include a movable base 120, wherein base 10 includes a plurality of wheels 118.

Still referring to FIG. 1A, in some embodiments, camera head 102 may include a 3D camera, such as a 4K imaging device that enables the perception of depth in images to replicate three dimensions as experienced through human binocular vision. Some 3D cameras may use two or more lenses to record multiple points of view, while others may use a single lens that shifts its position. Types of 3D cameras may include a stereo camera, 3D scanner, range camera, structed light camera or an imaging device capable of stereo vison, Time-of-flight (ToF), 3D scanning, laser triangulation, and the like. In some embodiments, apparatus 100 may include a machine vision system that includes at least camera head 102. A machine vision system may use images from at least camera head 102, to make a determination about a scene, space, and/or object. For example, in some cases a machine vision system may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and φ may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level. In some cases, a machine vision system may use a classifier, such as any classifier described throughout this disclosure.

Still referring to FIG. 1A, articulating arm 106 may include an extendable arm to move or control camera head 102. For example, articulating arm 106 may include a gas spring pneumatic arm. In some embodiments, articulating arm 106 may include a robotic arm to move or control camera head 102. For example, a robotic arm may include an articulated arm, a six-axis arm, a collaborative robot arm, a SCARA arm, a cartesian arm, a cylindrical arm, a spherical/polar arm, a parallel/delta arm, a anthropomorphic arm, a dual-arm, and the like. In some cases, articulating arm 106 may be controlled by electronics module 108 or remotely by a remote computing device, such as a controller operated by a technician during surgery to change the field of vision of camera head 102. A "remote computing device," as used herein, is a computing device located remote from apparatus, but communicatively connected to the apparatus.

Figure 1B:
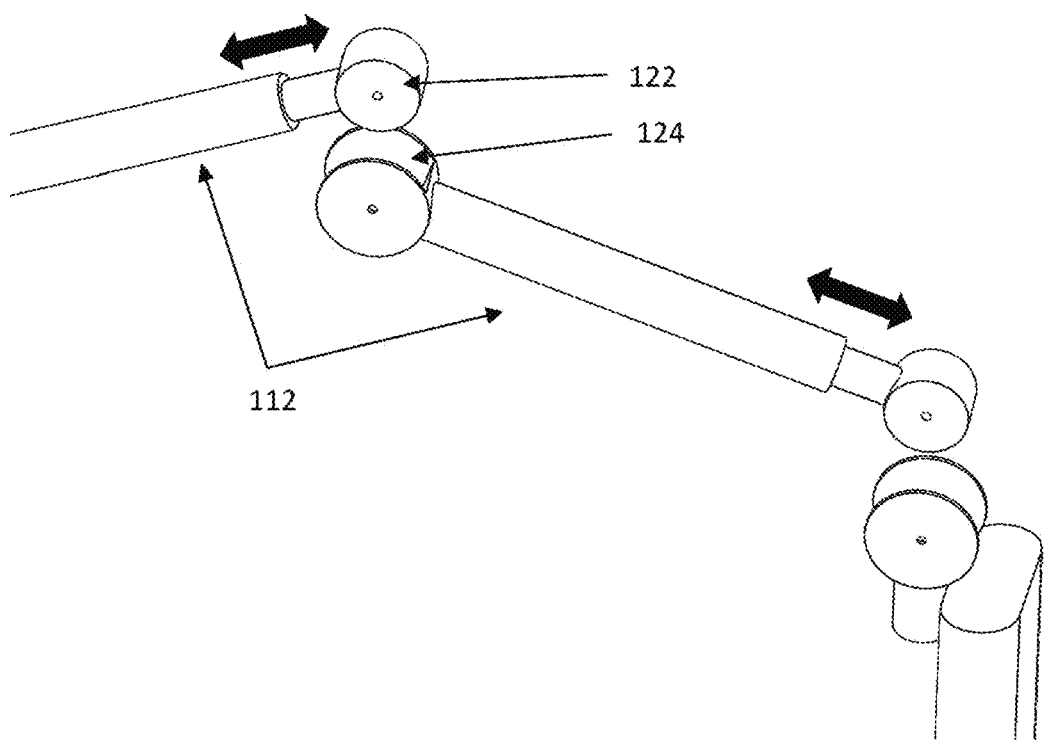
FIG. 1B illustrates a close up view of an articulating arm demonstrating an expansion and shrinking capability of pistons utilizing ball-and-socket joint mechanism.

Referring now to FIG. 1B, a close up view of articulating arm 106 demonstrating an expansion and shrinking capability of the pistons at rotatable joints 114, wherein 122 depicts a joint end of a piston attached to a joint end 124 of another piston.

Figure 1C:
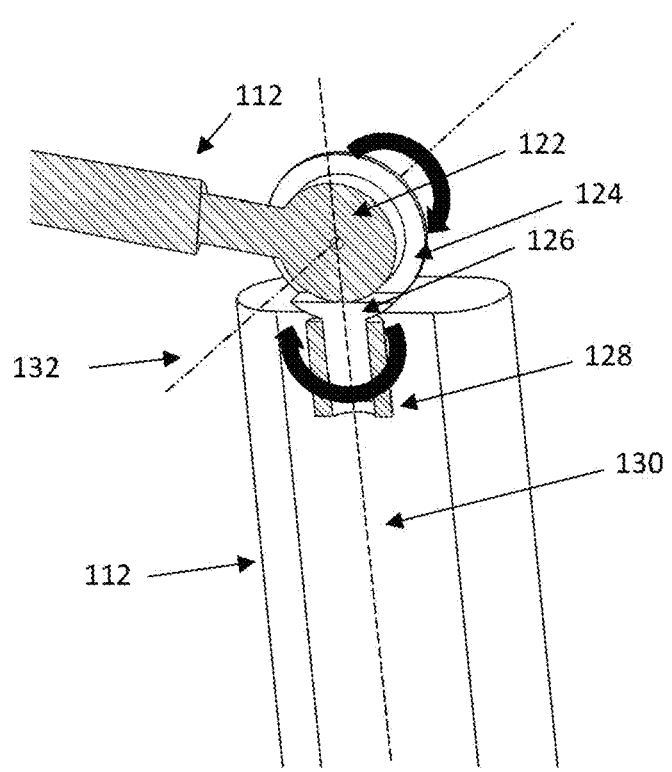
FIG. 1C illustrates a close up view of an articulating arm at a rotatable joint.

Referring now to FIG. 1C, a close-up view of articulating arm 106 at a rotatable joint. A joint may operate on a vertical axis 130 of rotation and an orthogonal axis 132 of rotation. In some embodiments, an end of piston 112 may include a socket 128, as in a socket for a joint structure 126 to connect to using a joint mechanism as described above. In some embodiments, socket 128 and joint structure 126 may utilize a ball-and-socket joint mechanism as described above, a pin socket mechanism, a hinge joint mechanism, and the like. In some embodiments, socket 128 may include a bearing. A "bearing," for the purposes of this disclosure is a mechanical device configured to reduce friction between two moving surfaces.

Figure 1D:
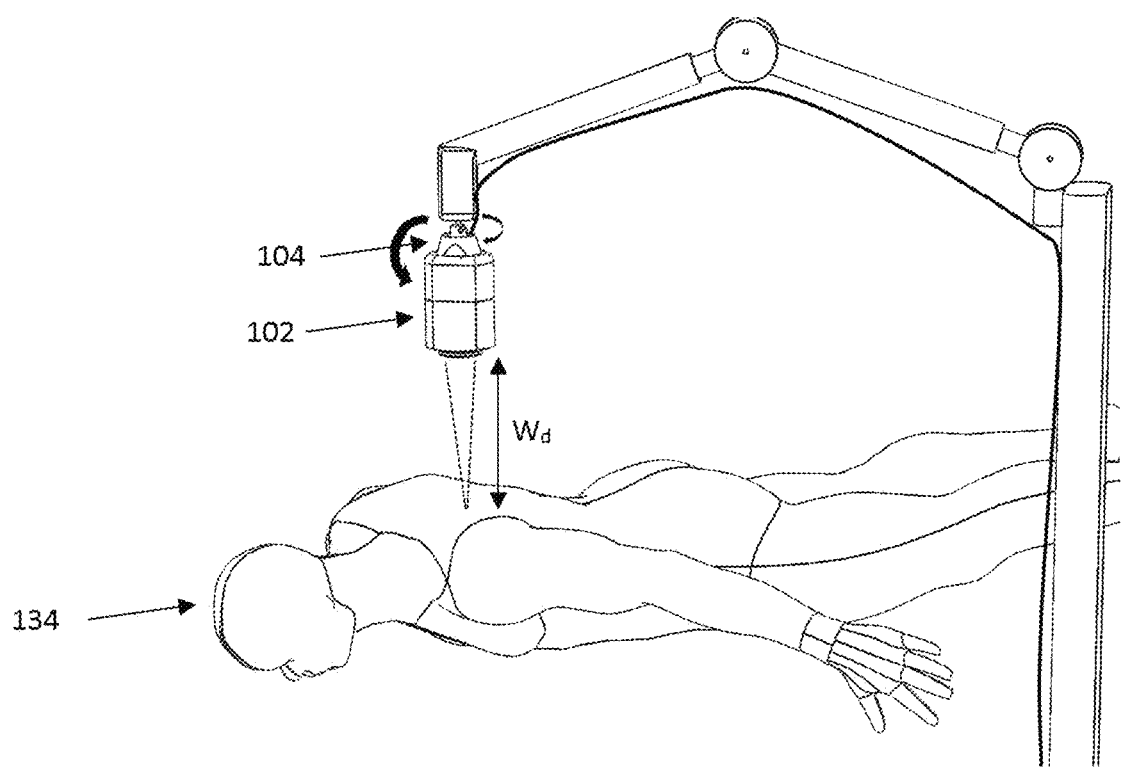
FIG. 1D illustrates an exemplary embodiment of an apparatus in working distance (WD) of an object of interest.

Referring now to FIG. 1D, an exemplary embodiment of apparatus 100 in working distance (WD) of an object of interest 134. A "working distance," as used herein, is the free space between an object of interest and a front lens of an optical device. The working distance may refer the frees space in which the convergence of two angles from two camera lenses occurs to give a 3D image. Additionally, camera head 102 may utilize lasers to measure and determine a working distance. For example, camera head 102 may utilize a laser by pulsing the laser and timing the return of the light back to a light detector. A high speed processor, such as in electronics module 108, may then calculate the distance between the laser and object of interest 134 based upon the measured return time. A module for this may include "LIDAR" which stands for Light Detection and Ranging.

Figure 1E:
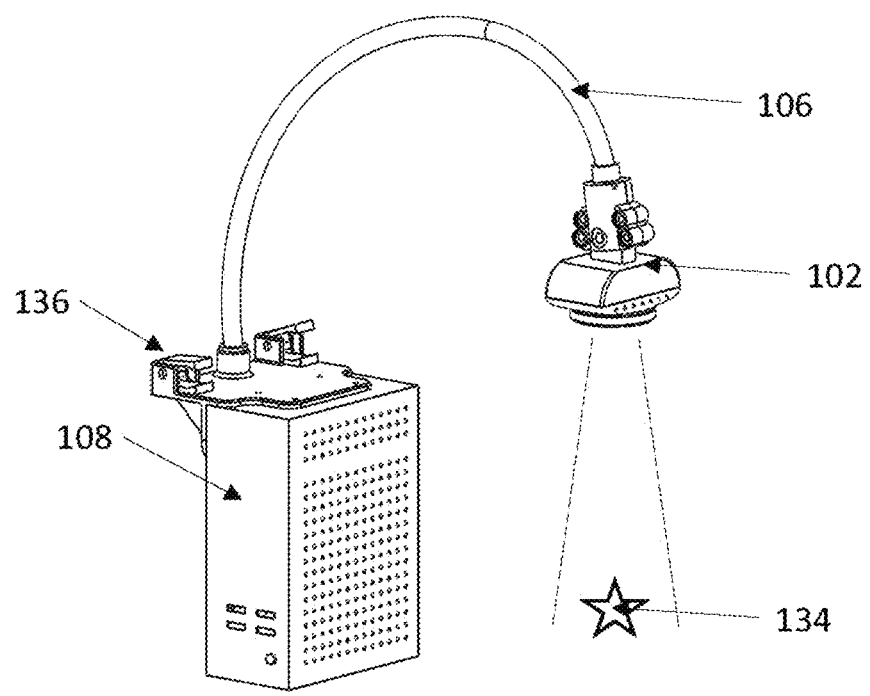
FIG. 1E illustrates an exemplary embodiment of an apparatus for enabling maneuverable stereoscopic field of view.

Referring now to FIG. 1E, an exemplary embodiment of apparatus 100 for enabling a maneuverable stereoscopic field of view is illustrated. In some embodiments, apparatus 100 may include one or more clamps 136 located on top of electronics module 108, wherein apparatus 100 may be attached to a table or a plurality of surface and devices. A "clamp," as used herein," is mechanical device configured to hold items in place by pressing two or more items together. A clamp may include, as non-limiting examples, a Kant twist clamp, hose clamp, cable clamp, clasps, clips, and the like.

Figure 1F:
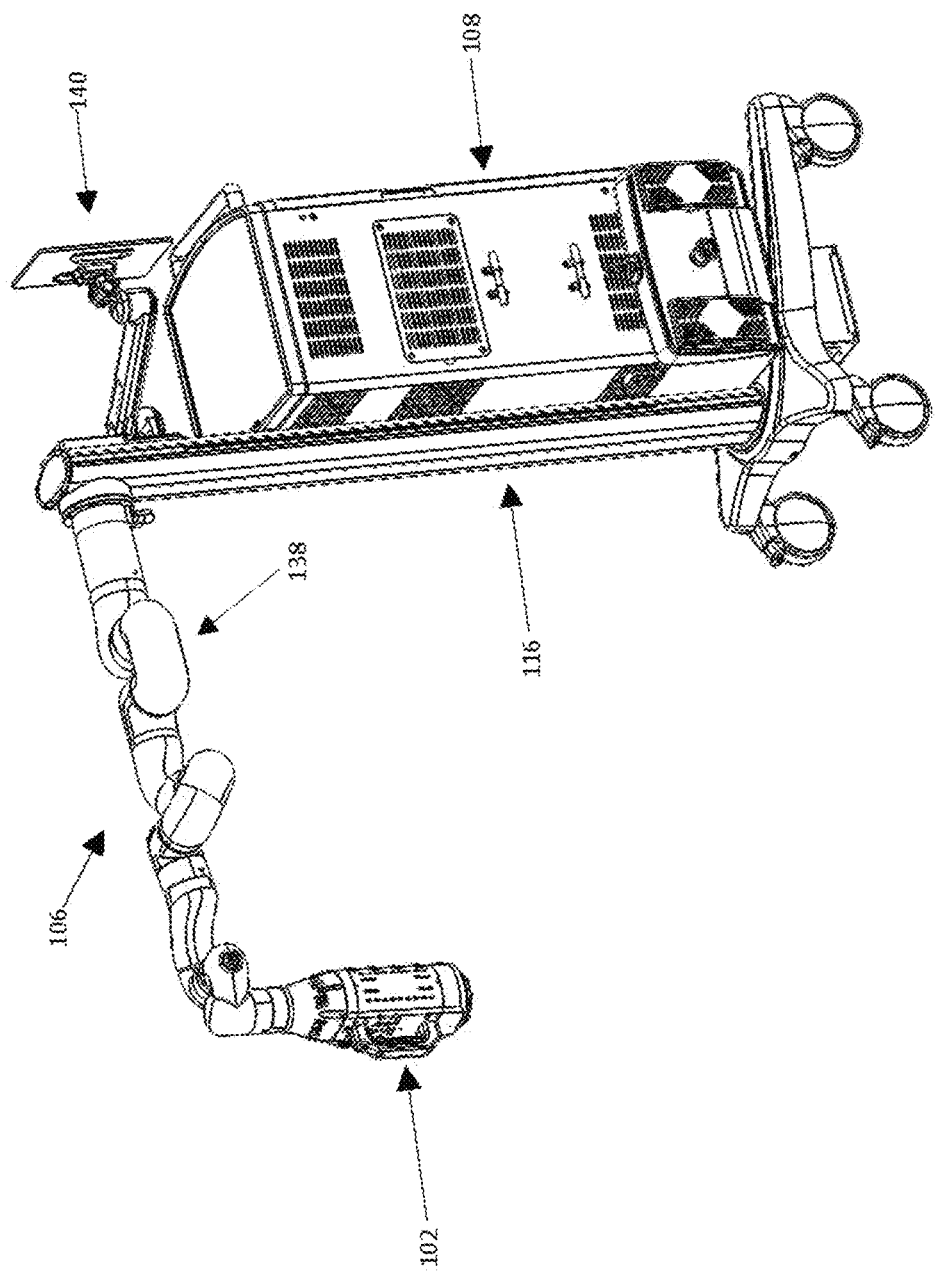
FIG. 1F illustrates an exemplary embodiment of an apparatus for enabling maneuverable stereoscopic field of view.

Referring now to FIG. 1F, an exemplary embodiment of apparatus 100 including a robotic articulating arm 106 for enabling a maneuverable stereoscopic field of view is illustrated. The robotic arm may include a robotic arm as described above. The robotic arm may include a plurality of cylindrical segments 138. Each cylindrical segments 138 may be linked together in a pattern to devised to allow 360 degree rotation of articulating arm 106 along a X, Y, and Z axis. Each cylindrical segment 138 may be configured to rotate independently or in tandem of one another. In some embodiments, backbone 116 may be equipped with a track configured to lower and raise articulating arm 106 along the length of backbone 116. In some embodiments, apparatus 100 may be equipped with a visual screen 140 attached the back of backbone 116. A "visual screen," as used herein, is a device configured to render an image. Visual screen 140 may be configured to receive and display image data from camera head 102.

Figure 2A:
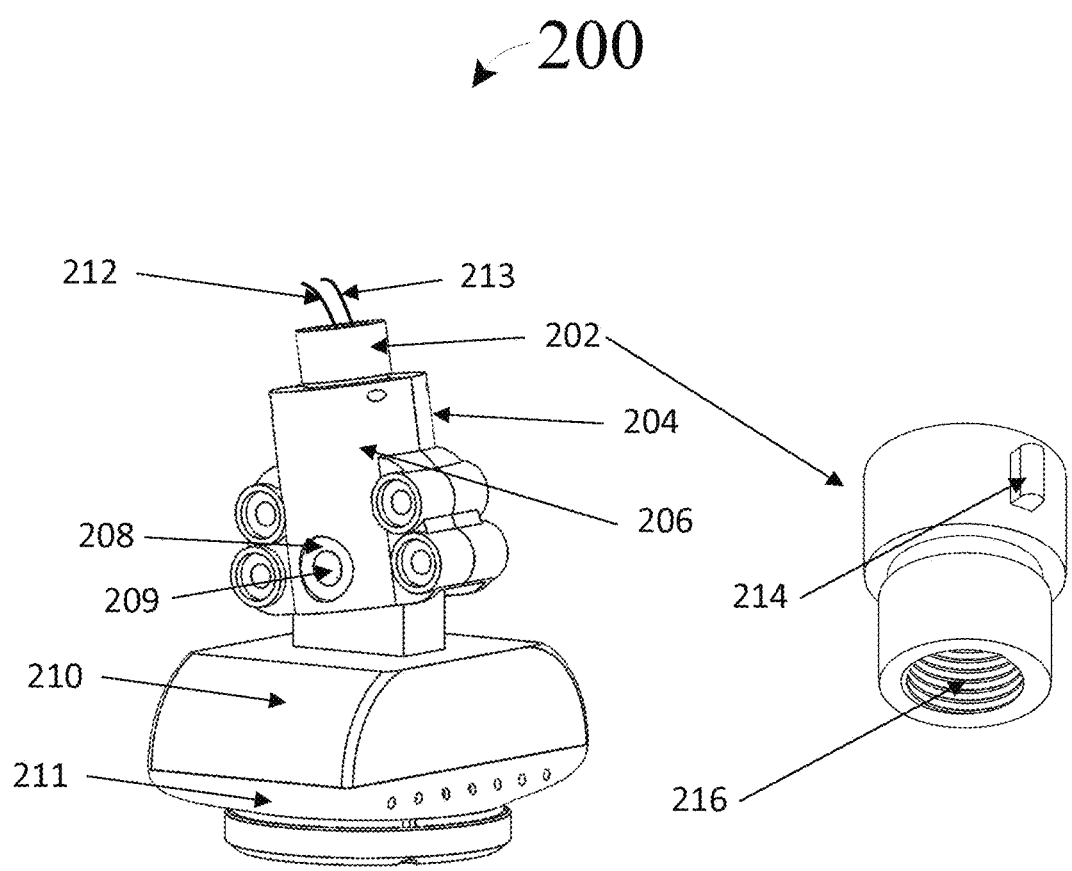
FIG. 2A illustrates a perspective view of a camera head that enables rotational adjustment of the stereoscopic field of view in two planes.
Figure 2B:
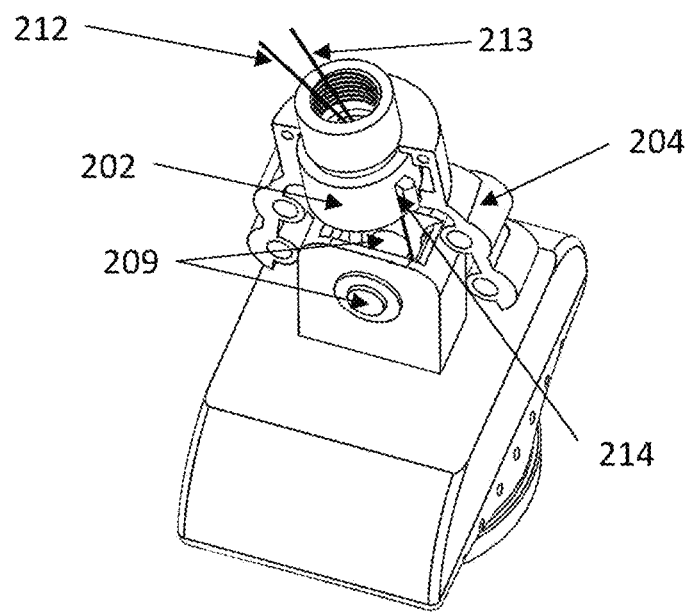
FIG. 2B illustrates a partial view of a camera head that enables rotational adjustment of the stereoscopic field of view in two planes.
Figure 2C:
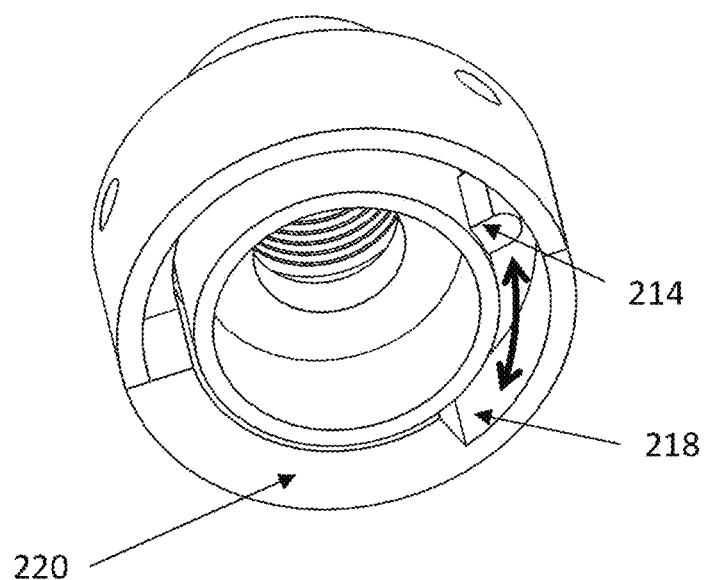
FIG. 2C illustrates a close-up segmented view of a camera head rotational spindle that enables rotational adjustment of a camera head.

Referring now to FIGS. 2A-2C, a close-up segmented view of a camera head and rotational spindle 202, also referred to as spindle herein, that enables rotational adjustment of a camera head. A "spindle," as used herein, is a rotating shaft with a fixture for holding an object. Spindle 202 may include grinding spindles, electric spindles, machine tool spindles, low-speed spindles, high speed spindles, and the like. Spindle 202 may be disposed in between a first clam shell 204 and a second clam shell 206 in such a way that it can rotate within a rotational track 218. A clam shell may refer to an encapsulating apparatus made of plastics, metal, and the like. Spindle 202 may allow the passage of a first image data cable 212 and a second image data cable 213. In some embodiments, spindle 202 may include a rotation stopper 214. Spindle 202 may rotate along a rotational track 218 until a rotation stopper 214 comes into contact with the rotational limit wall 220, thereby enabling a range of angular displacement depending on the size of the rotational limit wall 220. The range of angular displacement can vary from 0 degrees to 360 degrees, depending on the user's rotational needs. For example, the range may be from 0-45 degrees, 0-90 degrees, 0-180 degrees, 0-270 degrees and the like. The proximal camera head housing 210, being also attached to the combined first clam shell 204 and second clam shell 206, may also rotate along by the same angular displacement, and by translation rotate the stereoscopic view capturing the object of interest 134. A "proximal camera head housing," as use herein, is camera head housing situated closest to first and second clam shell A "distal camera head housing," as use herein, is camera head housing situated closest to an object of interest.

Figure 3A:
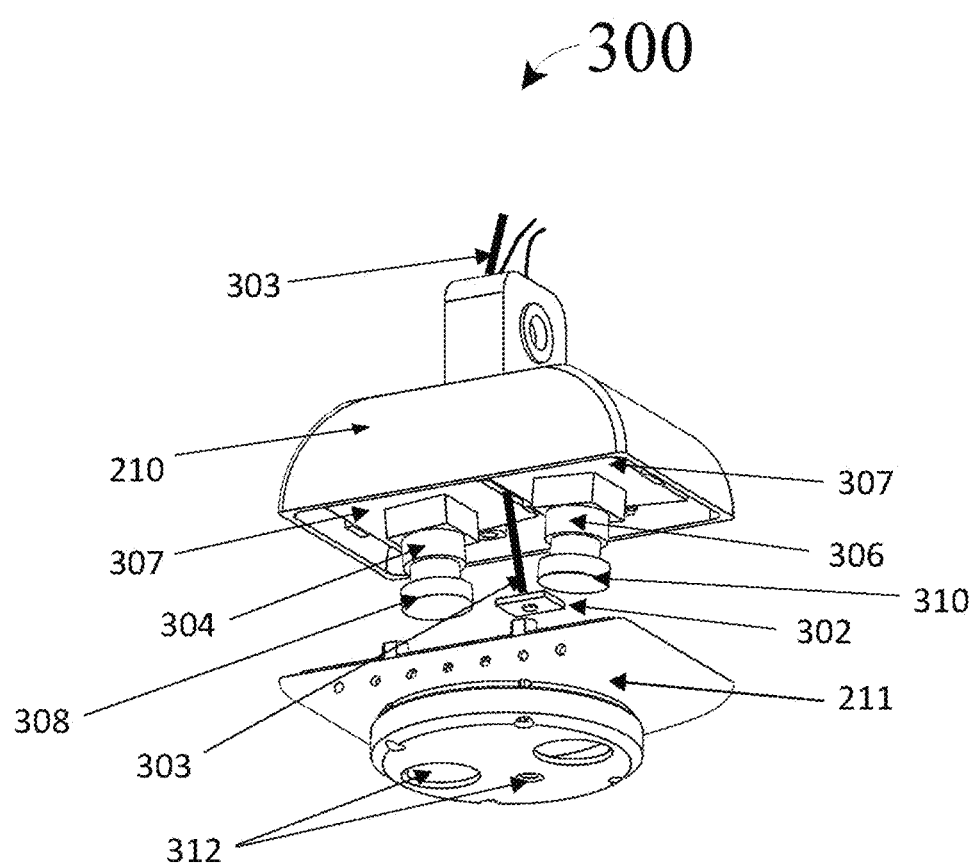
FIG. 3A illustrates an exploded view of a camera head.

Referring now to FIG. 3A, an exploded view of a camera head 300, including a proximal camera head housing, a distal camera head housing, a first camera 304, a second camera 306, image signal processor boards 307, and a light source 302. First camera 304 and second camera 306 may include any type of cameras as disclosed and with reference to FIG. 1. An "image signal processor board," as used use herein, is an electronic circuit board configured to process image data. "Image data," as used herein, is data regarding a visual representation of an object. For example, image data may include pictures or video captured by first camera 304 and second camera 306. Image data may include a two-dimensional or three-dimensional still image moving image, still frame, and the like. Image signal processor boards 307 may process image data captured by first camera 304 and second camera 306, such as debayering, color correction, hue, saturation, brightness, white balance, compression to various codecs including but not limited to YUV, JPEG, MPEG2, AVC/H.264, VP8, and other image signal processing functions, and then format the image data to be sent via the image data cables as illustrated in FIG. 2A. In a first embodiment, first camera 304 and second camera 306 may be attached to their own respective image signal processor boards 307 via a wire or direct electrical connection. In another embodiment, first camera 304 and second camera 306 may be attached to a common image signal processor board 307. First camera 304 may include a first camera lens 308, and the second camera 306 may include a second camera lens 310, for the purposes of magnifying and focusing the incoming images onto the pixels of the cameras. Camera lens may include a parfocal lens, varifocal lens, telescopic lens, superzoom lens, wide-angle zoom lens, and the like. Lenses of first camera 304 and second camera 306 may be interchangeable. First camera lens 308 and second camera lens 310 may be formatted to accept light frequencies from a visible spectrum, infrared spectrum, or other spectrums. Light source 302 may include an LED, Xenon-bulb circuit, or fiber optic cables and receive power from light source power cable 303 that runs through the entirety of camera head 300, articulating arm 106, and to the electronics module 108. The electronics and cameras can be enclosed by securing distal camera head housing 211 to proximal camera head housing 210. The distal camera head housing 211 may include a plurality of apertures 312 that function as openings for first camera lens 308, second camera lens 310, and light source 302 to either receive or transmit light with an un-interrupted line-of-sight to the object of interest 134. An "aperture," as used herein, is a hole or an opening through which light travels.

Figure 3B:
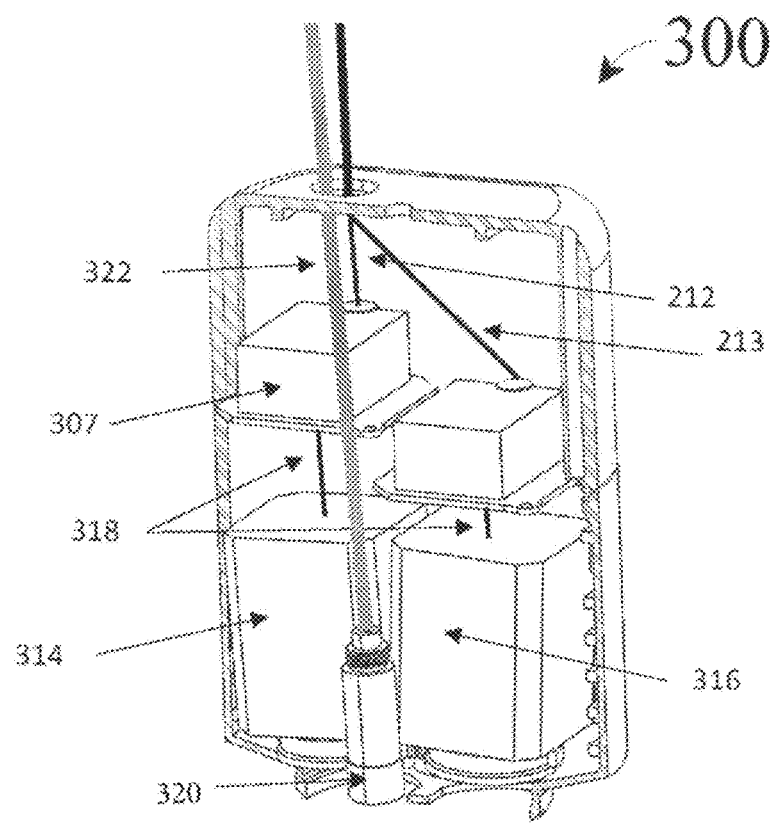
FIG. 3B illustrates an exemplary embodiment of a camera head.
Figure 3C:
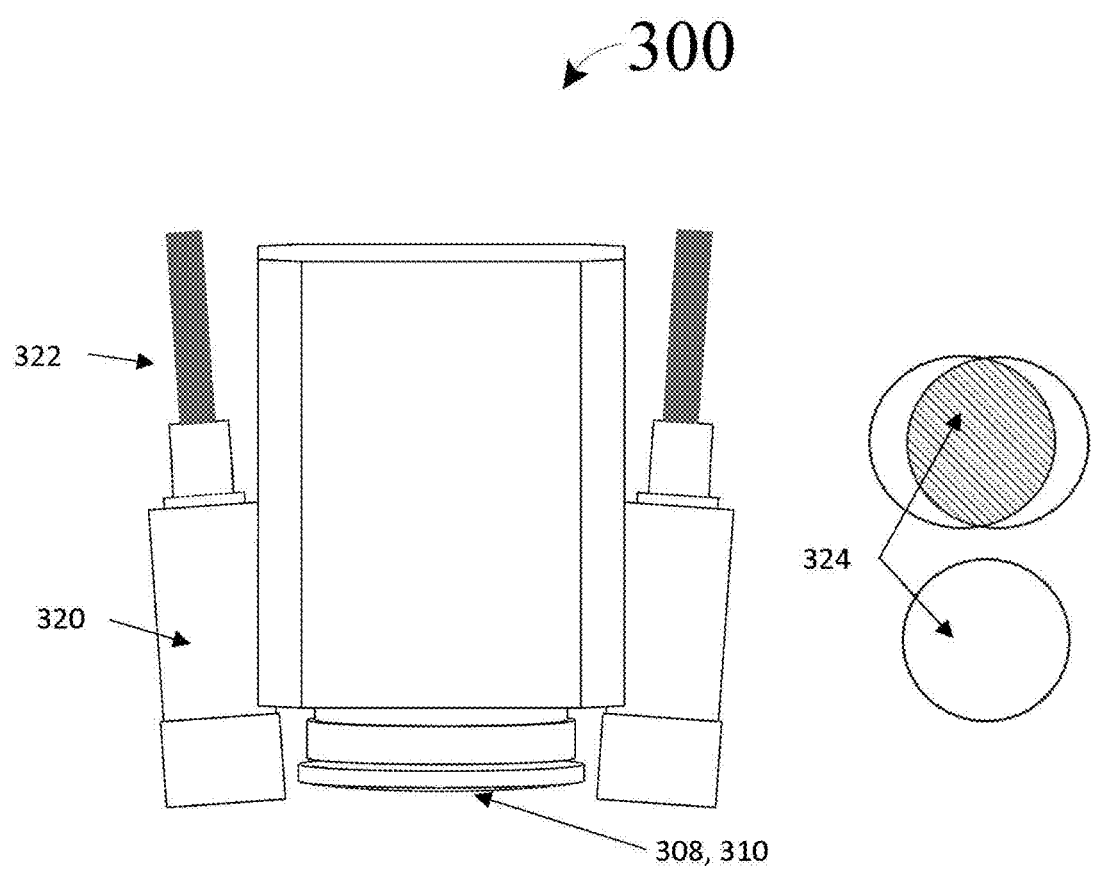
FIG. 3C illustrates an exemplary embodiment of a camera head with a polarizing lens.

Referring now to FIG. 3B, an exemplary embodiment of camera head 300. Camera head 300 may include a left camera block 314 and a right camera block 316. A "camera block," as used herein, is a housing containing at least a camera For example, left camera block 314 may contain first camera 304 and right camera block 316 may contain second camera 306. Camera head 300 may include one or more data cables 318, such as a left cable and a right cable connected to the corresponding camera block, wherein image data is transmitted to image signal processor board(s) 307. Camera head 300 may include fiber optic cable 322 connected to an optical focusing lenses 320.

Referring now to 3C, an exemplary embodiment of camera head 300 with a polarizing lens 324. A "polarizing lens," as used herein, is s an optical filter that lets light waves of a specific polarization pass through while blocking light waves of other polarizations. Polarizing lenses 324 may include near polarizers and circular polarizers. Polarizing lenses 324 may be used to block glares in response to any type of lights that may affect the rendering of a 3D image. In some embodiments, camera head 103 may include two polarizing lenses 324, such as a first polarizing lenses and a second polarizing lenses. First polarizing lenses may be placed in front of optical focusing lenses 320, wherein rotation of camera head 300 may allow for the removal of first polarizing lenses from use. Second polarizing lenses may be permanently affixed to first camera lens 308 and or second camera lens 310.

Figure 3D:
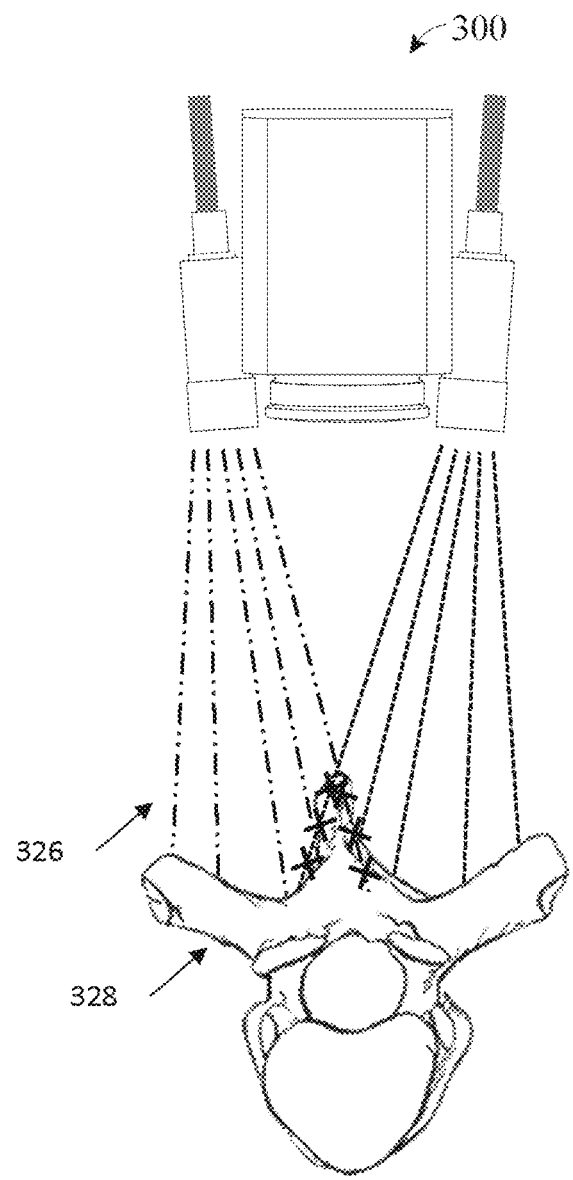
FIG. 3D illustrates an exemplary diagram of a camera head demonstrating an stereoscopic view by incorporating different lighting angles of a human spine.

Referring now to FIG. 3D, an exemplary diagram of camera head 300 demonstrating a stereoscopic view by incorporating different lighting angles 326 of a human spine 328. A "lighting angle, as used herein, is the direction of a light. First camera 304 and second camera 306 may each be equipped with a light source and provide an independent lighting angle 326 of one another. The Xs provided in FIG. 3D indicate the field of scope each light angle 236 may reach to render a visualization of parts of human spin 328.

Figure 4:
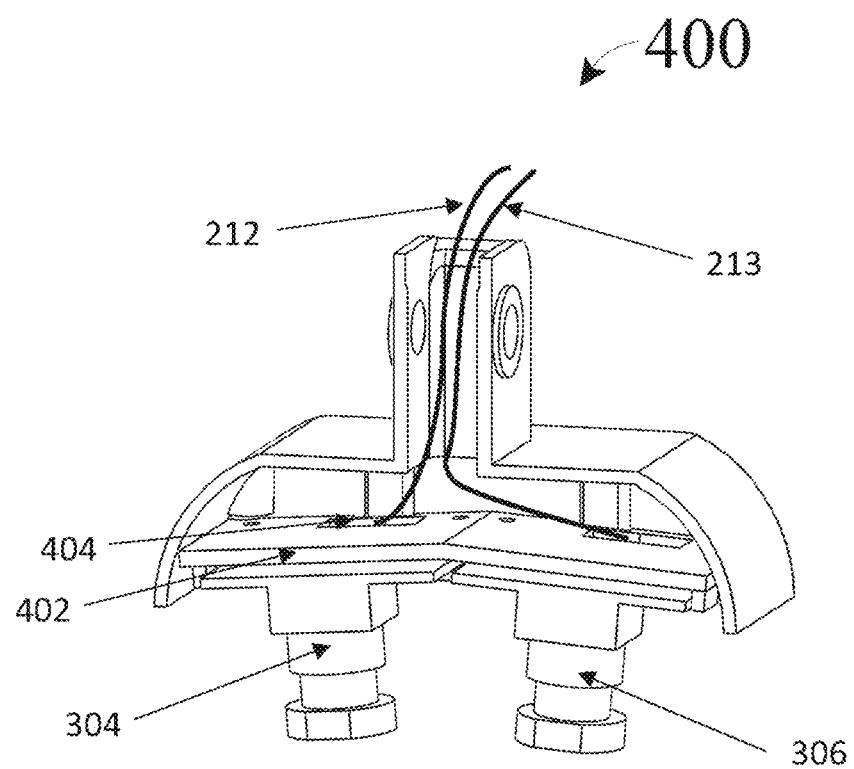
FIG. 4 illustrates a partial view of the interior of a camera head.

Referring now to FIG. 4, a partial view of the interior of a camera head 400. In this embodiment, first camera 304 and second camera 306 may be securely fastened to an alignment plate 402 that can be composed of a metal, plastic, ceramic, or composite thereof. The alignment plate may rigidly maintain the position of first camera 304 and second camera 306 relative to one-another to guarantee consistent stereoscopic alignment of the images, and can be manufactured in varying formations (e.g. angles) to create different types of stereoscopic images. For example, alignment plate 402 may be set at an angle of 0-10 degrees. For example, alignment plate 402 may be set at an angle of 0-5 degrees. Alignment plate 402 includes a plurality of alignment plate apertures 404 to enable the passage of first image data cable 212 and second image data cable 213 from first camera 304 and second camera 306 to the remainder of the system.

Referring now to FIG. 5, a partial view 500 of the interior of an electronics module 108 500 that enables receipt, processing, and transmission of stereoscopic video data. "stereoscopic video data," for the purposes of this disclosure, is data representing a stereoscopic video. "Stereoscopic video," as used herein, is a video that creates the illusion of depth for a viewer by way of binocular vision. Stereoscopic video data may include a video supplying the illusion of depth by the presentation of a slightly different image to each eye. For example, image data captured by camera head 102 may be used to produce a live feed video display of a person's anatomy to a surgeon during surgery. Electronics module 108 includes a processor. Processor may include, without limitation, any processor described in this disclosure. Processor may be included in a computing device. Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting Computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented, as a non-limiting example, using a "shared nothing" architecture.

With continued reference to FIG. 5, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 5, electronics module 108 may include an outer casing 501 that encapsulates the interior electronics and acts as a barrier against external elements. The outer casing 501 may be made of a metal, plastic, ceramic, or composite thereof. Inside the electronics module 108 may be a central processing unit 504, a graphics processing unit 506, a random-access memory 508, a storage (e.g. solid-state drive) 510, a wireless card 512, a Bluetooth chip 514, power module 516, and light source 518. A "central processing unit," as used herein, is a part of a computer in which operations are controlled and executed. A "graphics processing unit," as used herein, is a specialized electronic circuit designed to manipulate and alter memory to accelerate the creation of images in a frame buffer intended for output to a display device. A "random-access memory," is a form of computer memory that can be read and changed in any order. A "wireless card," as used herein, is a wireless terminal device used to enable internet connection through the wireless connection network under the coverage of a wireless local area network. A "Bluetooth chip," is a computer board level component that broadcast in the 2.4 GHz industrial, scientific, and medical (ISM) radio band. A "power module," as used herein, is a high-power electrical component that provides the physical containment for several power components. Image data cables, including first image data cable 212 and second image data cable 213, may pass through an outer casing hole 502, and connect to the central processing unit 504. First image data cable 212 and second image data cable 213 may also connect to the graphics processing unit 506. The images captured by the cameras and sent through first image data cable 212 and second image data cable 213 may be delivered to the central processing unit 504 or graphics processing unit 506 via analog, SDI, USB, HDMI, DP, Ethernet or other industry standard interface or protocol. Then, the central processing unit 504 may send the image data to the graphics processing unit 506, or the graphics processing unit 506 can independently implement software code to manipulate or correct the images for display. The random-access memory 508 may also work in tandem with the central processing unit 504 and graphics processing unit 506 to execute the software code and software functions. After the software code is implemented on the graphics processing unit 506, the image data may be transmitted to one or more head-worn visualization systems 608. Additionally, the processed image data may also be sent back to the central processing unit 504 for direct wired or wireless transmission via the wireless card 512 or Bluetooth chip 514 to a plurality of displays. The storage 510 maintains the software operating system and can also store recorded stereoscopic video from first camera 304 and second camera 306. The light source 518 may include an LED, Xenon-bulb, or some other light power source, which then transmits either light or power via the light source power cable 303. Power may be generated by or delivered to power module 516, which then delivers power to the other electronics in the electronics module 108. Power module may be linear, switched, or battery-based. Power module 516 may include transistors and diodes, metal oxide semiconductor field-effect transistors (MOSFETs), insulated-gate bipolar transistors (IGBTs), silicon-controlled rectifiers (SCRs), and the like.

Figure 5A:
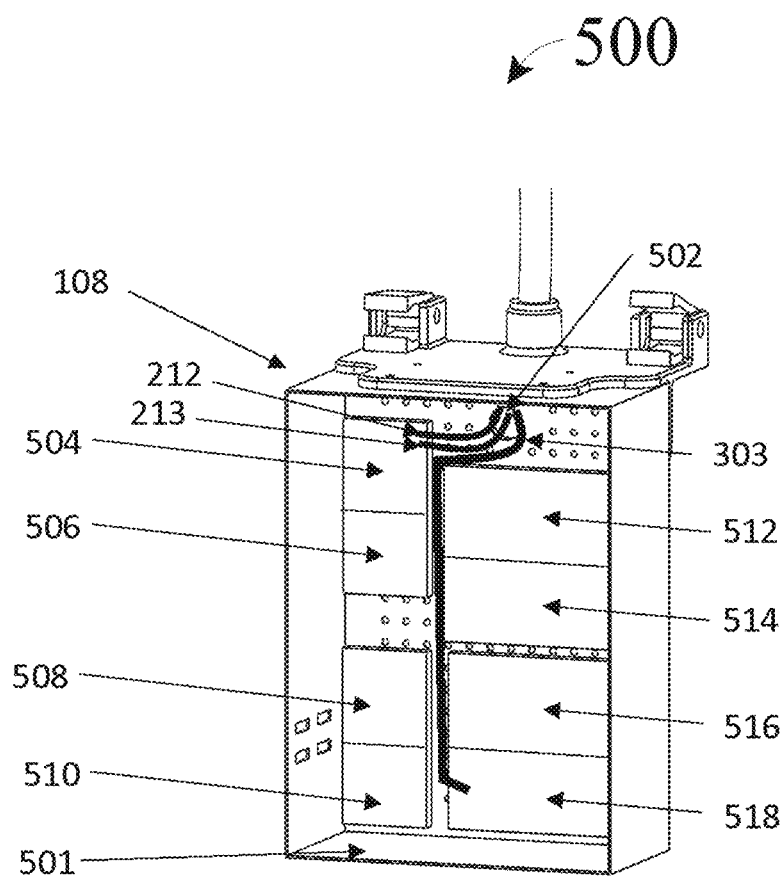
FIG. 5A illustrates a partial view of the interior of an electronics module that enables receipt, processing, and transmission of stereoscopic video data.

Still referring to FIG. 5A, in some embodiments, apparatus 100 may utilize cloud computing to optimize the processing and transmission of image data. "Cloud computing," as used herein, is the on-demand availability of computer system resources, such as data storage and computing power, without direct active management by a user. Cloud computing service may include servers, storage, databases, networking, software, analytics, and intelligence—over the Internet ("the cloud") to offer faster innovation, and flexible resources.

Figure 5B:
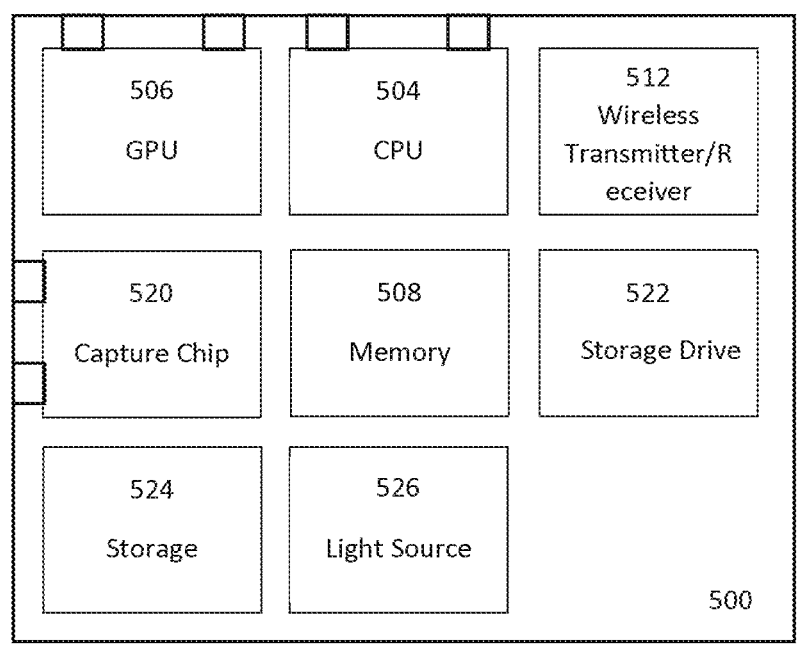
FIG. 5B illustrates an exemplary embodiment of components of an electronics module.

Referring now to FIG. 5B, an exemplary embodiment electronics module 108 components. In some embodiments, electronics module 108 may include a capture chip 520, storage drive 522, storage 524, and a light source 526. A "capture chip," as used herein, is a device that allows you to record or stream video and audio from another source. Capture chip 520 may be configured to take the image data from camera head 102 and encoding it into a format that can be recorded or streamed to a plurality of communicatively connected devices. Storage drive 522 may include a SSD, flash storage, hard drive, and the like. An "SSD" (solid-state drive), as used herein, is a type of storage device used in computers. This non-volatile storage media may store persistent data on solid-state flash memory. SSDs may replace traditional hard disk drives (HDDs) in computers and perform the same basic functions as a hard drive. Storage 524 may include any storage component of a computing device as a described throughout this disclosure. Light source 526 may include any light source component as a described throughout this disclosure.

Figure 6A:
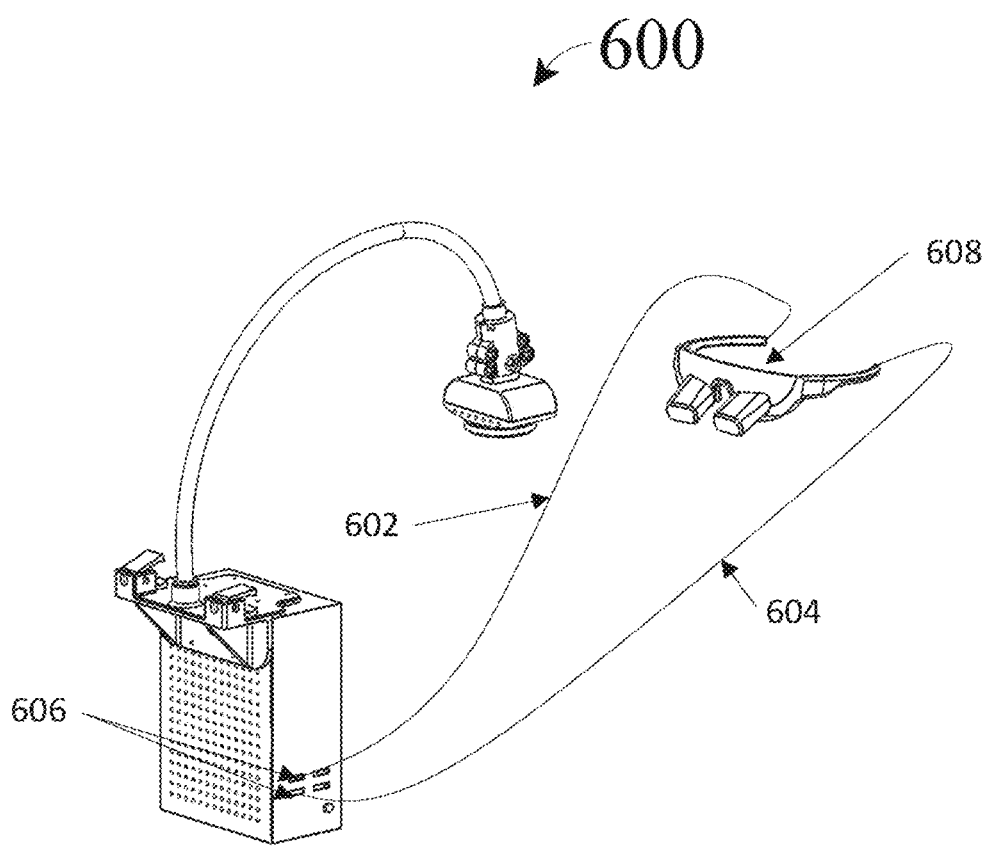
FIG. 6A illustrates a flexible camera apparatus and electronic module connected directly to a head-worn visualization system that enables local and remote stereoscopic visualization of the surgical field of view.

Referring now to FIG. 6A, FIG. 6A is an exemplary diagram of a flexible camera apparatus 600 and electronic module connected directly to a head-worn visualization system that enables local and remote stereoscopic visualization of the surgical field of view. A "head worn visualization system," as used herein, is a display device worn on a user's head. The visualization system may include a first glasses cable 602, a second glasses cable 604, a plurality of display cable connectors 606, and a head-worn visualization system 608. Glasses cables may include feeder cable or fiber optic cables as described above. A "feeder cable," as used herein, is a type of transmission line. Types of feeder cables may include an open wire or twin feeder, coax or coaxial cable, waveguide, planar lines, stripline, balanced lines, and the like. First glasses cable 602 and second glasses cable 604 may transmit corresponding image data from first camera 304 and second camera 306 that have been run through the software on the electronics module 108. Display cable connectors 606 may serve as an interface between electronics module 108 and the glasses cables, and may utilize the USB, HDMI, DP, Ethernet, or other data transfer protocols. The image data from first camera 304 and second camera 306 may be combined in the head-worn visualization systems 608 to produce a stereoscopic image/video data with depth perception.

Still referring to FIG. 6A, electronics module 108 may utilize a machine vision and/or a machine-learning process to generate a depth map. A "depth map," as used herein, is an image or image channel that contains information relating to the distance of the surfaces of scene objects from a viewpoint. A depth map may be used to simulate the effect of uniformly dense semi-transparent media within a scene—large volumes of bodily fluid. A depth map may be used to simulate shallow depths of field—where some parts of a scene may appear to be out of focus. Depth maps may be used to selectively blur an image to varying degrees. A depth map may be used to for Z-buffering and z-culling, techniques which may be used to make the rendering of 3D scenes more efficient. These techniques may be used by apparatus 600 to identify objects hidden from view and which may therefore be ignored for some rendering purposes. This may be particularly important in real time applications such as surgery, where a fast succession of completed renders must be available in time to be displayed at a regular and fixed rate. A depth map may be used to provide the distance information needed to create and generate auto-stereograms and in other related applications intended to create the illusion of 3D viewing through stereoscopy. Additionally, a depth map may be used for shadow mapping, subsurface scattering, and the like, Still referring to FIG. 6A, apparatus 600 may use a machine-learning process to match patient data to image data. "Patient data," as used herein, is data related to patient. Patient data may be data received and stored by electronics module 108. For example, patient data may include a patient's magnetic resonance imaging (MRI) scan, computed tomography (CT) scan, and the like. A machine-learning model such as a classifier may be trained and used to match patient data to image data. Training data may include scans of patient data correlated to scenes of image data. Training data may additionally include scene of patient data correlated to a depth map. A "machine learning process," as used in this disclosure, is a process that automatedly uses a body of data known as "training data" and/or a "training set" to generate an algorithm that will be performed by a computing device/module to produce outputs given data provided as inputs; this is in contrast to a non-machine learning software program where the commands to be executed are determined in advance by a user and written in a programming language." A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Apparatus 600 and/or another device may generate a classifier using a classification algorithm, defined as a processes whereby an apparatus 600 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 6A, apparatus 600 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Apparatus 600 may then calculate a likelihood table by calculating probabilities of different data entries and classification labels. Apparatus 600 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 6A, apparatus 600 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 6A, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum\nolimits_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 6A, electronics module 108 may generate an augmented reality overlay, also referred to as AR view, which may be displayed through head-worn visualization systems 608 as a function of processing image data. AR view may refer to the digital data generated by apparatus 600 that overlays image data or stereoscopic video data transmitted to head-worn visualization systems 608. For example, AR view may overlay an MRI scan correlated to the live imagery captured by camera head 102. Apparatus 600 may generate the overlay by using machine vision and a machine-learning process such as a classifier as described above. In some embodiments, apparatus may utilize SLAM (Simultaneous Localization and Mapping) technology to create the overlay. "SLAM technology," as used herein, is a technological mapping method. SLAM technology may refer the computational problem of constructing or updating a map of an unknown environment while simultaneously keeping track of an object's, such as camera head, location within it. In some embodiments, apparatus 600 may generate the overlay additionally using a graphical user interface (GUI). A "graphical user interface," as used herein, is a form of interface that allows users to interact with electronic devices through graphical icons and audio indicator. For example, apparatus may use the programming techniques used in generating a GUI to create and display an AR overly.

Figure 6B:
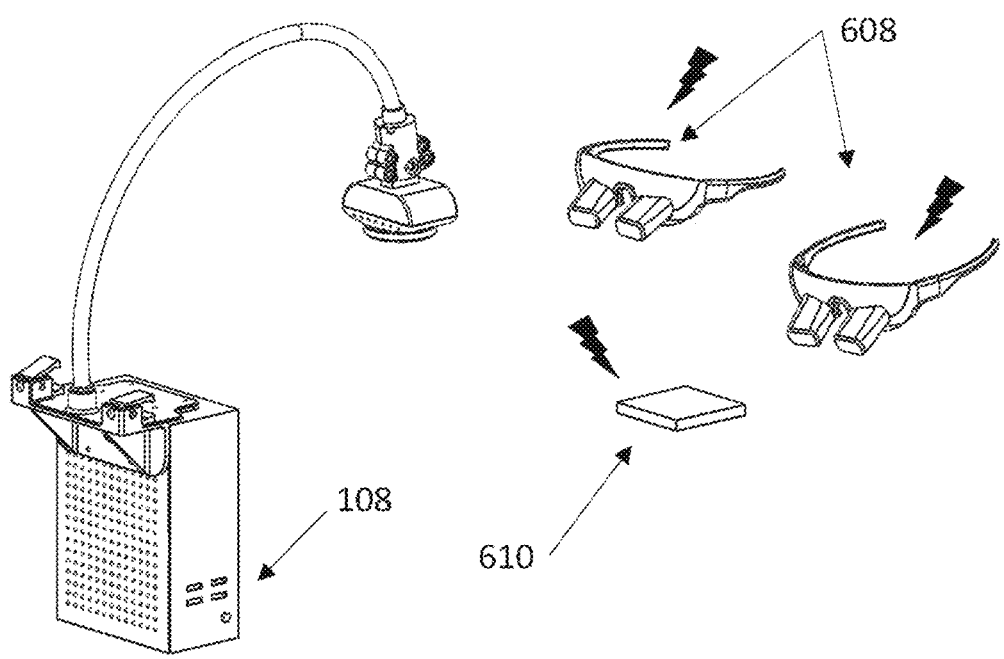
FIG. 6B illustrates a flexible camera apparatus and electronics module connected wirelessly to a console and/or one or more head-worn visualization systems that enables local and remote stereoscopic visualization of the surgical field of view.

Referring now to FIG. 6B, an exemplary diagram of apparatus 100 connected wirelessly to a console 610 and/or one or more head-worn visualization systems 608 that enables local and remote stereoscopic visualization of the surgical field of view. Wireless card 512 in the electronics module 108 may transmit image data from first camera 304 and second camera 306 to console 610. Console 610 may include a wireless router, a computer, a central processing unit, a graphics processing unit, and/or a wireless receiving card. Console 610 may perform additional software functions on the incoming image data, such as white balance, de-bayering, image rotation, image alignment, compression, de-compression, packetization, or other functions before transmitting the image data to the head-worn visualization systems 608 for display to the user, or can transmit the original data with no manipulation to the head-worn visualization systems 608 for display to the user. The image data from first camera 304 and second camera 306 may be combined in head-worn visualization systems 608 to produce a stereoscopic image/video data with depth perception. Console 610 may also wirelessly send the image data to other displays for additional viewing options, or can also connect to the internet to broadcast the image data to other receiving devices remotely.

Figure 7A:
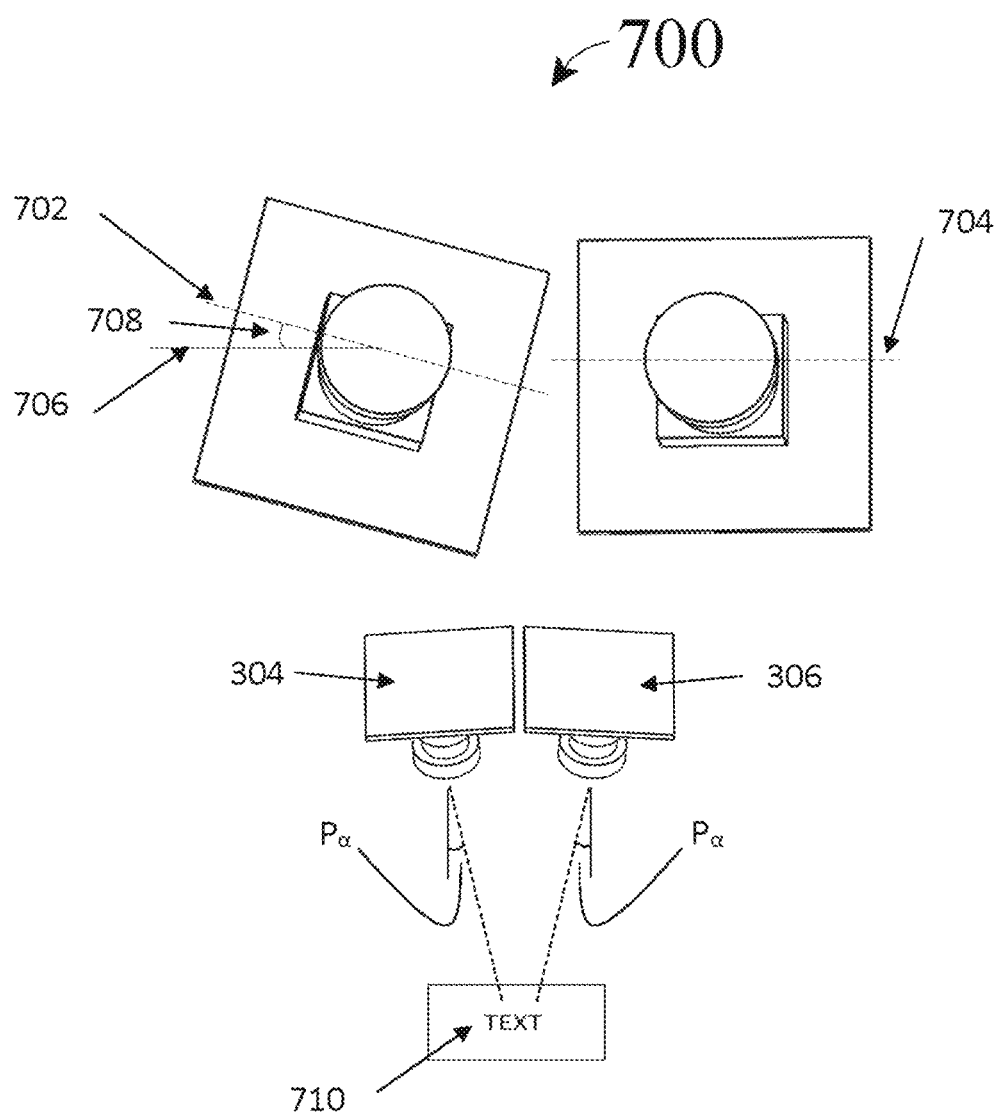
FIG. 7A illustrates a first camera and a second camera, where the first camera has an alignment defect and is off-axis. It also depicts an embodiment where the cameras are directed on a parallax at an object with a TEXT label.

Referring now to FIG. 7A, an exemplary embodiments a first camera 304 and a second camera 306, where first camera 304 has an alignment defect and is off-axis. It also depicts an embodiment where the cameras are directed on a parallax at an object with a TEXT label 710. First camera 304 is aligned on a first horizontal axis 702 and the second camera is aligned on a second horizontal axis 704, relative to the normal horizontal axis 706. While other figures depict an embodiment where the first camera horizontal axis 702 and second camera horizontal axis 704 are colinear with relation to one-another and to the normal horizontal axis 706, this FIG. 7 depicts an embodiment where the cameras may have a mechanical defect during alignment and are angularly displaced relative to one-another. This embodiment demonstrates that the first camera horizontal axis 702 is rotated relative to the normal horizontal axis 706 by an angular displacement 708, which can range from 0 degrees to 359 degrees. There is also depicted a further embodiment of first camera 304 and second camera 306 directed downward at an object with a TEXT label 710. First camera 304 and second camera 306 are angularly displaced from the normal vertical axis by the same parallax angle Pα. This parallax angle Pα generates two distinct images of the TEXT label 710 from two distinct angles, which when displayed stereoscopically on the two displays of the head-worn visualization system 608 will create 3D-effect and depth perception for the viewer. This is essentially re-creating the biological stereoscopic effect of our human eyes.

Figure 7B:
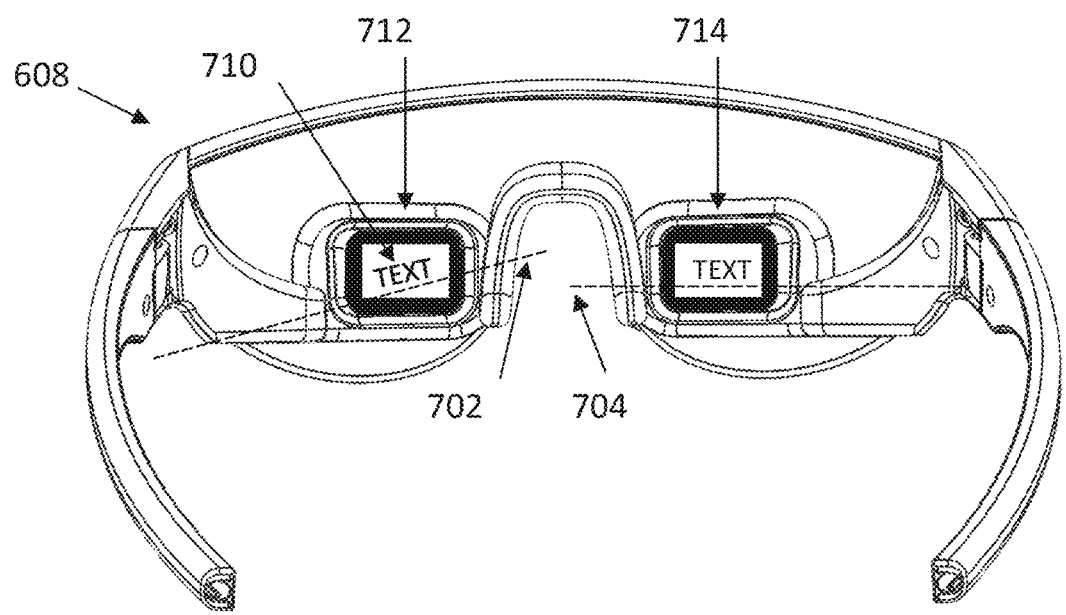
FIG. 7B illustrates a head-worn visualization system displaying the first camera view of the TEXT label on a left display and the second camera view of the TEXT label on a right display.

Referring now to FIG. 7B, a head-worn visualization system 608 displaying first camera 304 view of the TEXT label 710 on a left display 712 and the second camera 306 view of the TEXT label 710 on a right display 714. The left display 712 and right display 714 can be an organic light-emitting diode (OLED), a light-emitting diode (LED), a liquid-crystal display (LCD), a liquid-crystal on silicon display (LCoS), a projector, or any other type of pixel-based display. The left display 712 is displaying an embodiment of first camera 304 where its first camera horizontal axis 702 is angularly displaced relative second camera horizontal axis 704, and therefore displaying the TEXT label 710 on an angular displacement relative to the right display 714. This will prevent the viewer from seeing any stereoscopic effect or depth perception, since it is unnatural for the human eyes to be angularly displaced relative to one-another, and lead to eye strain and discomfort. The solution to this alignment problem is to either mechanically correct first camera 304 so that its first camera horizontal axis 702 is colinear with the second camera horizontal axis 304, or perform a software correction function on the electronics module 108 before the image data is sent out to the head-worn visualization 608 for display. In some embodiments, head-worn visualization system 608 may include a interchangeable lens mechanism as disclosed in U.S. Provisional patent application Ser. No. 18/129,560, filed on Mar. 31, 2023, and titled "INTERCHANGEABLE LENS MECHANISM FOR A HEAD-WORN DISPLAY SYSTEM AND METHOD OF ASSEMBLING THE LENS MECHANISM," which is incorporated by reference herein in its entirety.

Figure 8:
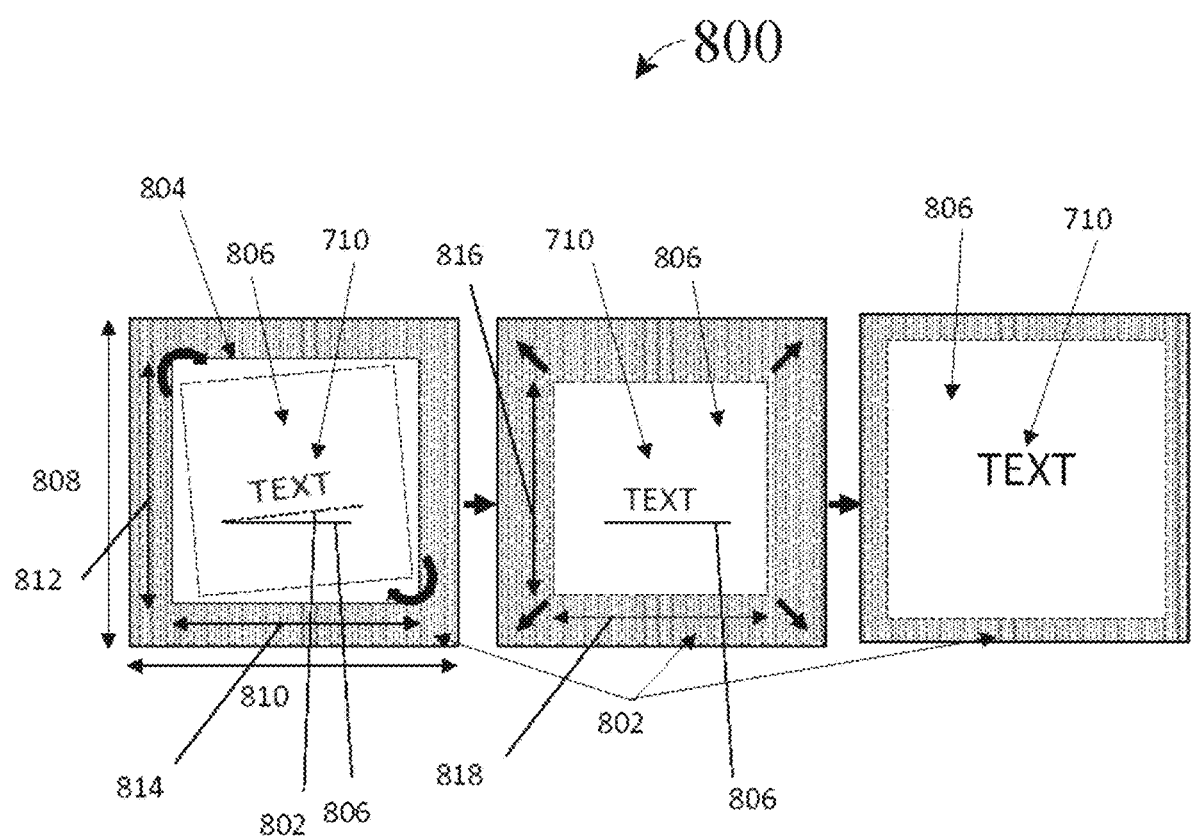
FIG. 8 illustrates a digital rotation software function.

Referring now to FIG. 8, an exemplary diagram of a digital rotation software function 800. A "digital rotation software function," as use herein, is software configured to realigns images. Digital rotation software function 800 may include a series of steps that takes incoming image data from first camera 304 or second camera 306, such as the TEXT label 710, and re-aligns its first horizontal axis to the normal horizontal axis 806. The TEXT label 710 is depicted on a head-worn visualization system 608 display where the display is composed of a series of horizontal and vertical pixels that form a pixel background 802 with a vertical background height 808 and a horizontal background height 810. An active pixel camera image 804 is depicted in the center of the pixel background 802 but may be located in other areas along the pixel background 802. The active pixel camera image 804 has a vertical image height 812 and a horizontal image height 814. Digital rotation software function 800 takes a sub-image 806 of the active pixel camera image 804 that is rotated by the same angular displacement 808 between the first horizontal axis 702 and normal horizontal axis 806. In a following step, the pixels around the sub-image 806 are cropped and the sub-image 806 is rotated by the angular displacement 808 so that it becomes aligned to the normal horizontal axis 806. The sub-image 806, being smaller than the original active pixel camera image 804, now has a vertical sub-image height 816 and a horizontal sub-image height 818. The sub-image can be re-sized in a final step so that the vertical sub-image height 816 is equal to the former vertical image height 812 and the horizontal sub-image height 818 is equal to the former horizontal image height 814, making the adjustment un-noticeable by the viewer. The sub-image may also be resized so that the vertical sub-image height 816 and horizontal sub-image height 818 is larger or smaller than the vertical image height 812 and horizontal image height 814. When digital rotation software function 800 is used on the image data from first camera 304 to align its first horizontal axis 702 to the second horizontal axis 804 of the second camera 306, and then both images displayed on the left display 812 and right display 814, the user will be able to resolve the stereoscopic view and appreciate a comfortable 3D video feed.

Figure 9:
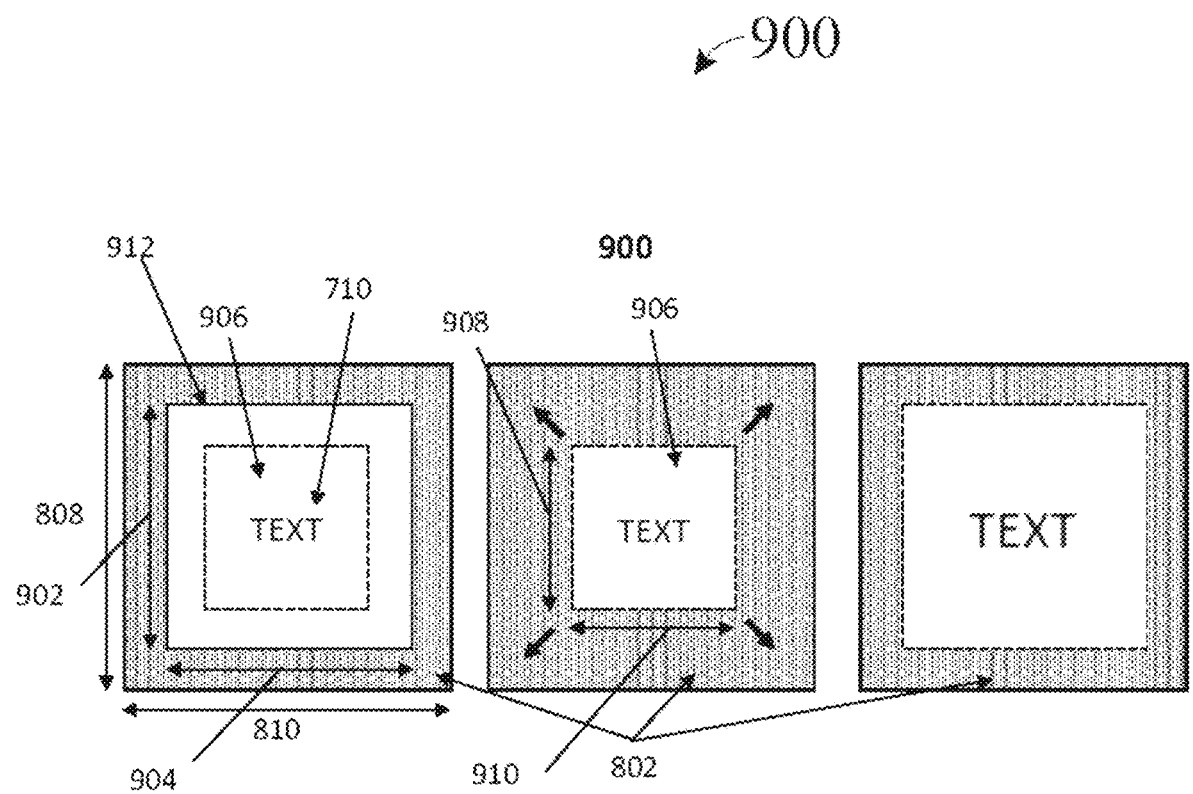
FIG. 9 illustrates a digital zoom software function.

Referring now to FIG. 9, a digital zoom software function 900. A "digital zoom software function," as used herein is software configured to expand the display of an image. The digital zoom software function 900 may include a series of steps that takes an incoming image from a first camera 304 or second camera 306, such as the TEXT label 710, and highlights certain portions of the image by expanding a sub-image region. The TEXT label 710 is depicted on a head-worn visualization system 608 display where the display is composed of a series of horizontal and vertical pixels that form a pixel background 902 with a vertical background height 908 and a horizontal background height 810. An active pixel camera image 912 is depicted in the center of the pixel background 802 but may be located in other areas along the pixel background 802. The active pixel camera image 912 has a vertical image height 902 and a horizontal image height 904. In a first step, the digital zoom software function 900 takes a sub-image 906 of the active pixel camera image 912, where the sub-image 906 has a vertical sub-image height 908 and a horizontal sub-image height 910. The zoom level requested by the viewer determines of the ratio between the vertical sub-image height 908 to vertical image height 902 and horizontal sub-image height 910 and horizontal image height 904. As an example, a 2 times (2×) zoom will mean that the ratio of the number of pixels in the vertical image height 902 to the number of pixels in the vertical sub-image height 908, and the number of pixels in the horizontal image height 904 to the number of pixels in the horizontal sub-image height 910 would be 2:1. In a final step, the sub-image 906 is re-sized so that the vertical sub-image height 908 is equal to the former vertical image height 902 and the horizontal sub-image height 910 is equal to the former horizontal image height 902. The digital zoom software function 900 further enables image panning. This is achieved by repeating the entire function and taking sub-images 906 from different regions of the active pixel camera image 912.

Figure 10A:
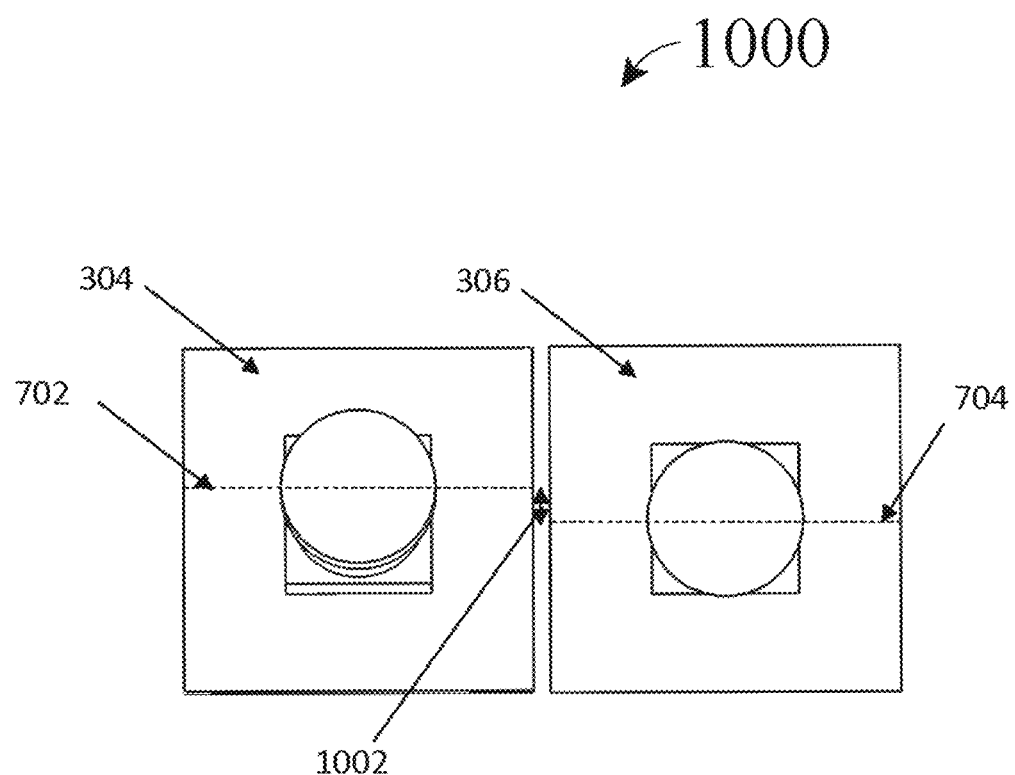
FIG. 10A illustrates a first camera and a second camera, where the first camera has an alignment defect and is vertically displaced relative to second camera.

Referring now to FIG. 10A, a first camera 304 and a second camera 306, where first camera 304 has an alignment defect and is vertically displaced relative to second camera 306. First camera 304 is aligned on a first horizontal axis 702 and the second camera is aligned on a second horizontal axis 704, where the first horizontal axis 702 is offset by a vertical displacement 1002 relative to the second horizontal axis 804.

Figure 10B:
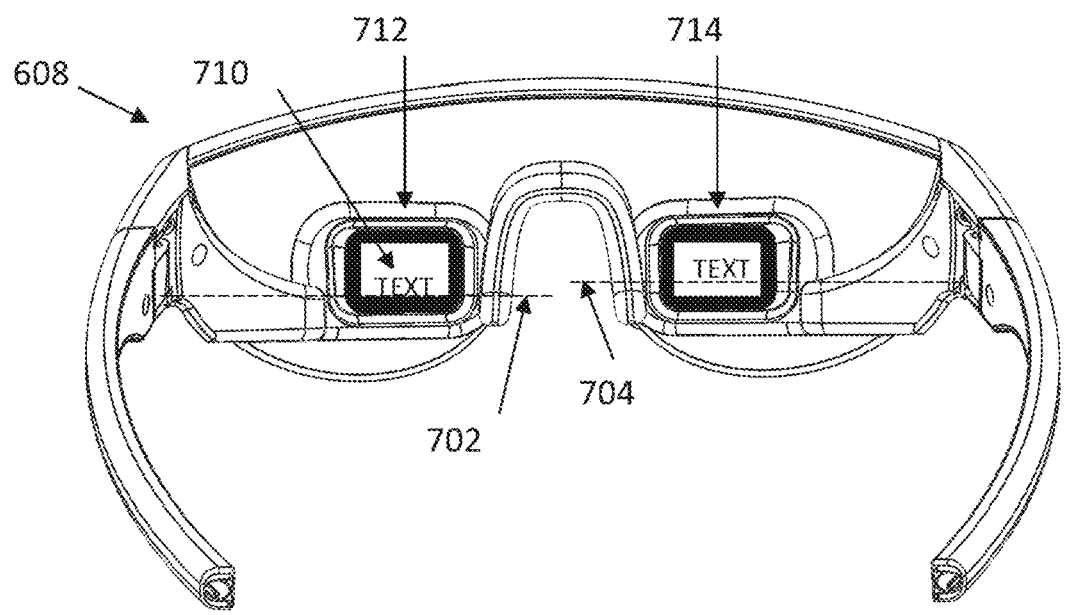
FIG. 10B illustrates a head-worn visualization system displaying the first camera view of the TEXT label on a left display and the second camera view of the TEXT label on a right display.

Referring now to FIG. 10B, illustrates a head-worn visualization system 608 displaying first camera 304 view of the TEXT label 710 on a left display 712 and the second camera 306 view of the TEXT label 710 on a right display 814. The left display 712 is displaying an embodiment of first camera 304 where its first camera horizontal axis 702 is vertically displaced by vertical displacement 1002 relative to the second camera horizontal axis 704, and therefore displaying the TEXT label 710 by a vertical displacement relative to the right display 714. This will prevent the viewer from seeing any stereoscopic effect or depth perception, since it is unnatural for the human eyes to be angularly displaced relative to one-another, and lead to eye strain and discomfort.

Figure 11:
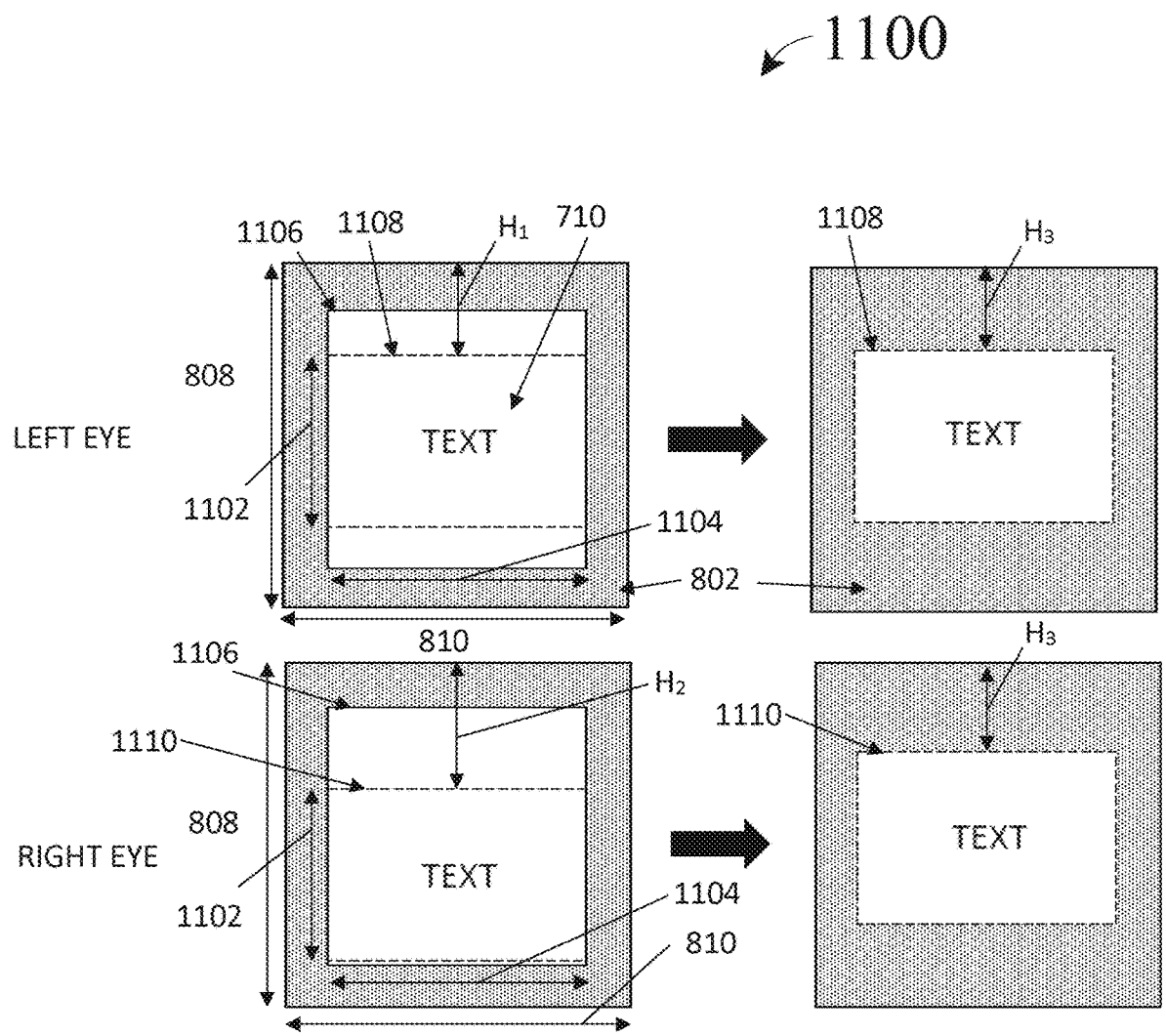
FIG. 11 illustrates a digital image height adjustment function.

Referring now to FIG. 11, a digital image height adjustment function 1100. A "digital image height adjustment function," as used herein, is software configured to adjust the height of an image. The digital image height adjustment function 1100 may include a series of steps that takes an incoming image from a first camera 304 or second camera 306, such as the TEXT label 710, and vertically shifts the images by cropping identical sub-images from different regions and re-centering them to create a shared horizontal position. The TEXT label 710 is depicted on a left display 812 and a right display 814 as part of a head-worn visualization system 608, where both displays are composed of a series of horizontal and vertical pixels that form a pixel background 802 with a vertical background height 808 and a horizontal background height 810. An active pixel camera image 1106 is depicted in the center of the pixel background 802 but may be located in other areas along the pixel background 802. This embodiment illustrates a TEXT label 710 on the left display 812 that is located higher along its active pixel camera image 1106 than the TEXT label 710 on the right display 814 with an identically positioned active pixel camera image 1106. The digital image height adjustment function 1100 takes a left sub-image 1108 of the image on the left display 812, where the left sub-image 1108 has a vertical image height 1102 and a horizontal image height 1104. The distance between the top pixel row of the left sub-image 1108 to the top of the pixel background 802 is measured by $H_1$, which identifies the relative position of the left sub-image 1108 to a right sub-image 1110. The central axis of the sub-images should be approximately aligned with the central axis of the object on which the cameras are focusing, which in this embodiment is the TEXT label 710. The right sub-image 1110 has the same vertical image height 1102 and horizontal image height 1104 as the left sub-image 1108, with a distance $H_2$ from its top pixel row to the top of an identically sized pixel background 802. In a next step, the digital image height adjustment function 1100 crops both the left sub-image 1108 and the right sub-image 1110, and then shifts both sub-images so that the central axis of the TEXT label 710 on the left display 812 and the central axis of the TEXT label 710 on the right display 812 are colinear. The final position of the left sub-image 1108, measured by $H_3$, matches the final position of the right sub-image 1110—also $H_3$.

Figure 12A:
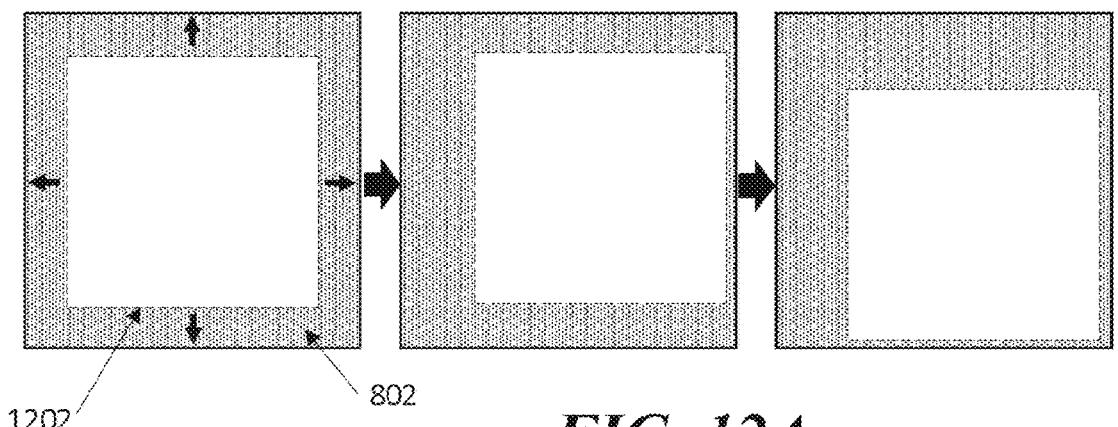
FIG. 12A illustrates a digital screen adjustment function being utilized on a head-worn visualization system display.

Referring now to FIG. 12A, a digital screen adjustment function 1200 being utilized on a head-worn visualization system 608 display. The display is composed of a series of horizontal and vertical pixels that form a pixel background 802. An active pixel camera image 1202 is depicted in the center of the pixel background 802 but may be located in other areas along the pixel background 802. The digital screen adjustment function 1200 vertically and horizontally shifts the location of the active pixel camera image 1202 along the pixel background 802.

Figure 12B:
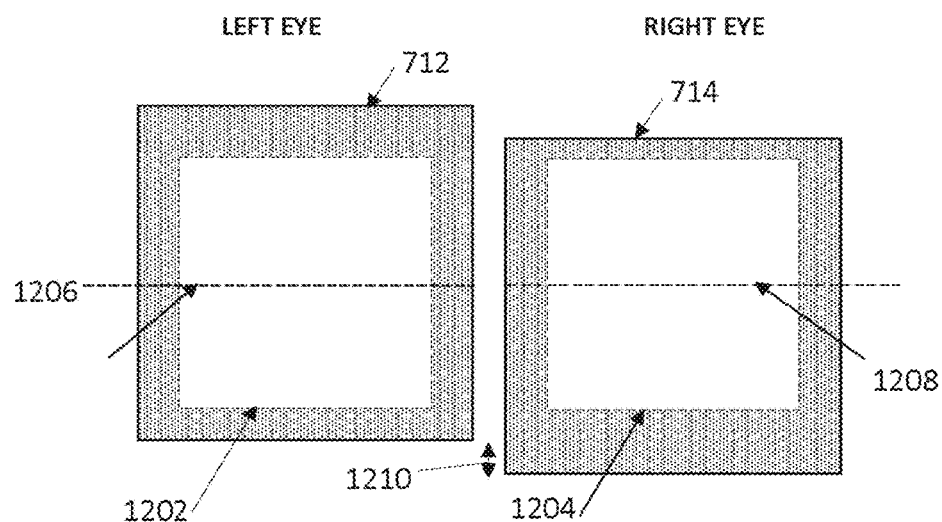
FIG. 12B illustrates a digital screen adjustment function being utilized to correct for a vertical misalignment of a left display and right display.

Referring now to FIG. 12B, a digital screen adjustment function 1200 being utilized to correct for a vertical misalignment of a left display 712 and right display 714. A "digital screen adjustment function," as used herein, is software configured correct misalignment in a display. The mechanical mis-alignment of the left display 712 and right display 714 relative to one-another is illustrated in this embodiment with a vertical displacement 1210. The digital screen adjustment function 1200 can be used to shift a left active pixel camera image 1202 and a right active pixel camera image 1204 in one or both displays by a combined pixel distance equivalent to the vertical displacement 1210, until the left central axis 1206 of the left active pixel camera image 1202 is colinear with the right central axis 1208 of the right active pixel camera image 1204.

Figure 12C:
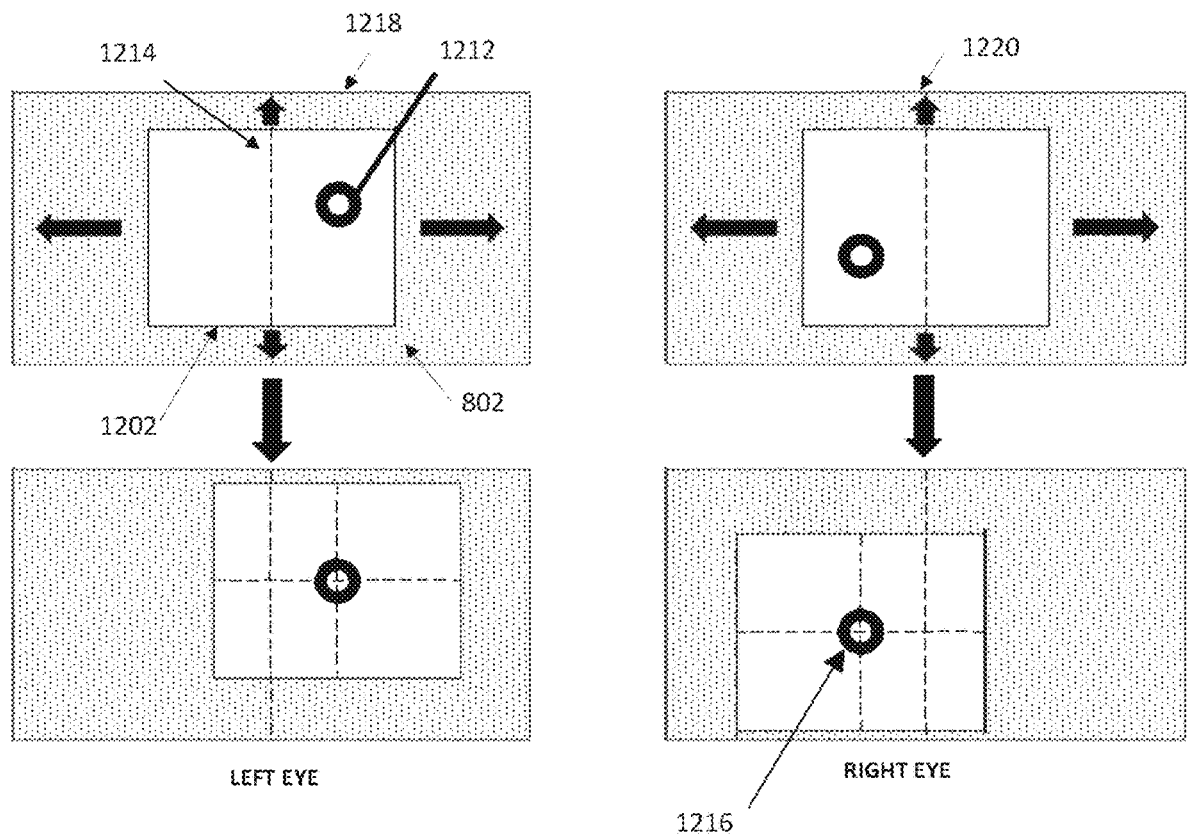
FIG. 12C illustrates a digital screen adjustment function being utilized to center an object of interest.

Referring now to FIG. 12C, a digital screen adjustment function 1200 being utilized to center an object of interest 1212 is illustrated. In some embodiments, digital screen adjustment function 1200 may incorporate digital rotation software function 800, digital zoom software function 900, and digital image height adjustment function 1100, as described above to auto center object of interest 1212 captured in a left camera image 1218 and a right camera image 1220. Digital screen adjustment function 1200 may center object of interest 1212. In this embodiment, a digital screen adjustment may occur in transition from a 4K image resolution to a lower resolution for image display through head-worn visualization system 608. For example the cameras, as described throughout this disclosure, may capture images in 4K resolution, or 4096 horizontal×2160 vertical pixels, however head-worn visualization system 608 may display the captured images in a lower resolution, such as 1280 horizontal×1024 vertical pixels, because a 4K display may be too large for display through the wearable glasses. In this regard, digital screen adjustment function 1200 may be configured to crop out a sub-image of the whole 4K image for display to the user (in both eyes), and the sub-section may start off getting cropped from the center of the 4K image. For example, object of interest 212 may not be perfectly centered along a center line 1214 of active pixel camera image 1202 in left camera image 1218 and right camera image 1220, digital screen adjustment function 1200 may operate to shift active pixel camera image 1202 along the pixel background 802 until object of interest 1212 is at a percent center point 1216, then crop for display through the left display and right display of head-worn visualization system 608 accordingly. A "perfect center point," as used herein, is a point wherein an object of interest in at least two displays is centered to provide binocular vision.

Figure 13:
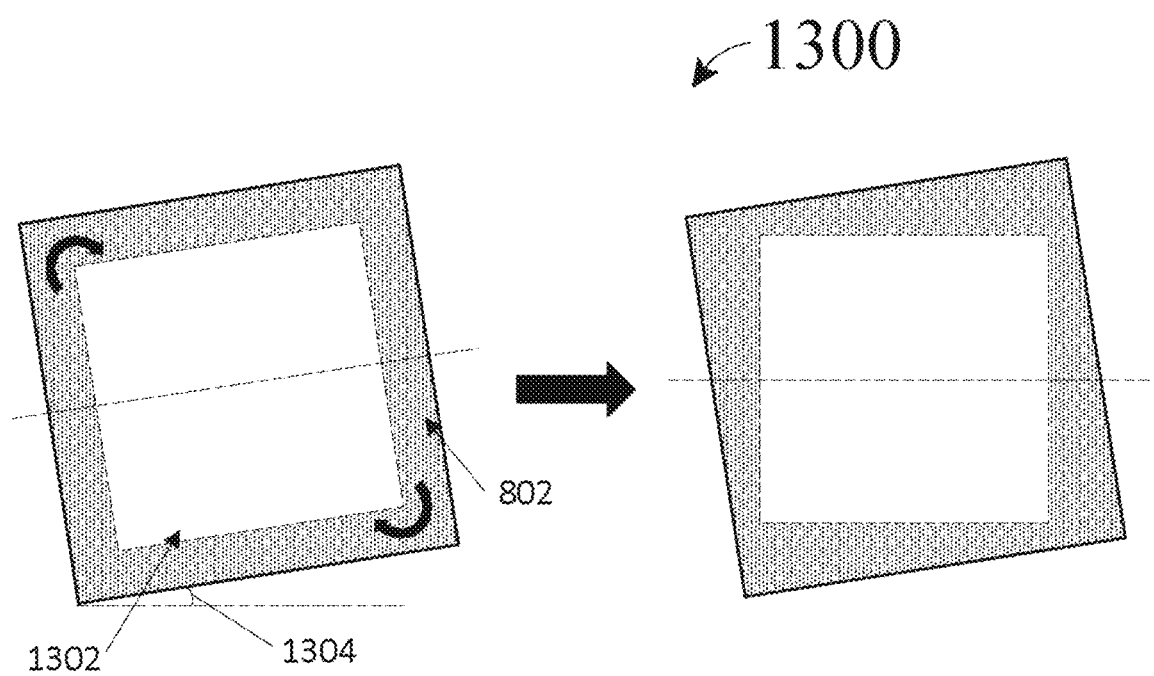
FIG. 13 illustrates a digital screen rotation function 1400 being utilized on a head-worn visualization system display.

Referring now to FIG. 13, a digital screen rotation function 1300 being utilized on a head-worn visualization system 608 display. A "digital screen rotation function," as used herein, is software used in pixel realignment. The display is composed of a series of horizontal and vertical pixels that form a pixel background 802. An active pixel camera image 1302 is depicted in the center of the pixel background 802 but may be located in other areas along the pixel background 802. This embodiment illustrates a head-worn visualization system 608 display with a mechanical misalignment measured by a display angular displacement 1304. The digital screen rotation function 1300 rotates the active pixel camera image 1302 within the pixel background 802 by the display angular displacement 1304 until the active pixel camera image 1302 lines up with the horizontal axis.

Figure 14:
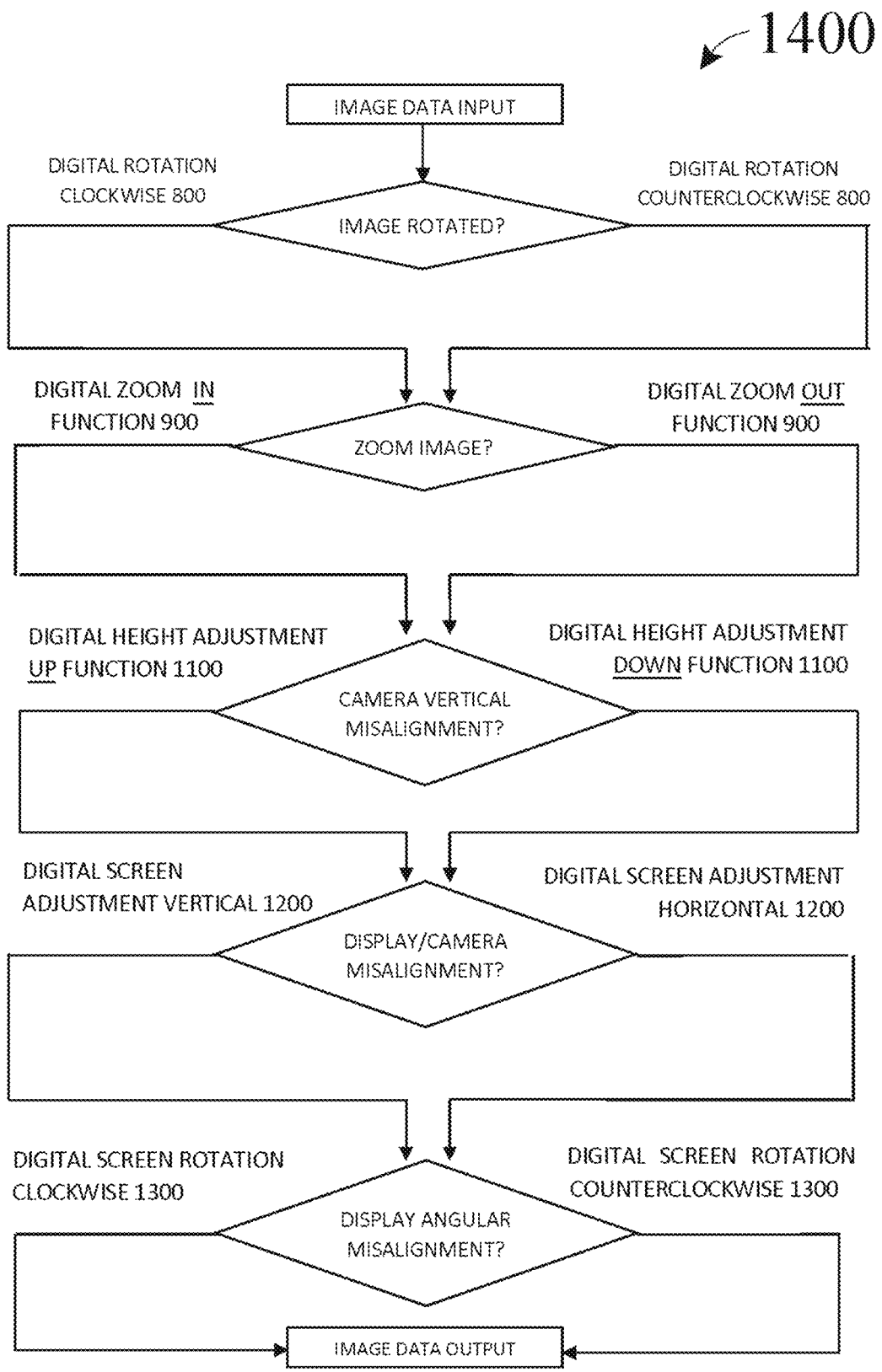
FIG. 14 illustrates a software code function series embodiment that corrects for multiple alignment defects.

Referring now to FIG. 14, a software code function series embodiment that corrects for multiple alignment defects. An embodiment is described as a sample cascade of software functions executed sequentially on a single display, including a digital rotation software function 800 to correct for an angular camera misalignment, a digital zoom software function 900, a digital image height adjustment function 1100 to correct for a vertical or horizontal camera misalignment, a digital screen adjustment function 1200 to correct for a vertical or horizontal display misalignment, and a digital screen rotation function 1300 to correct for an angular display misalignment. After executing these software functions on a left display 712 and right display 714 to correct for mechanical misalignments, the resulting images can be processed by a viewer in a stereoscopic manner, enabling comfortable 3D viewing and depth perception.

Figure 15:
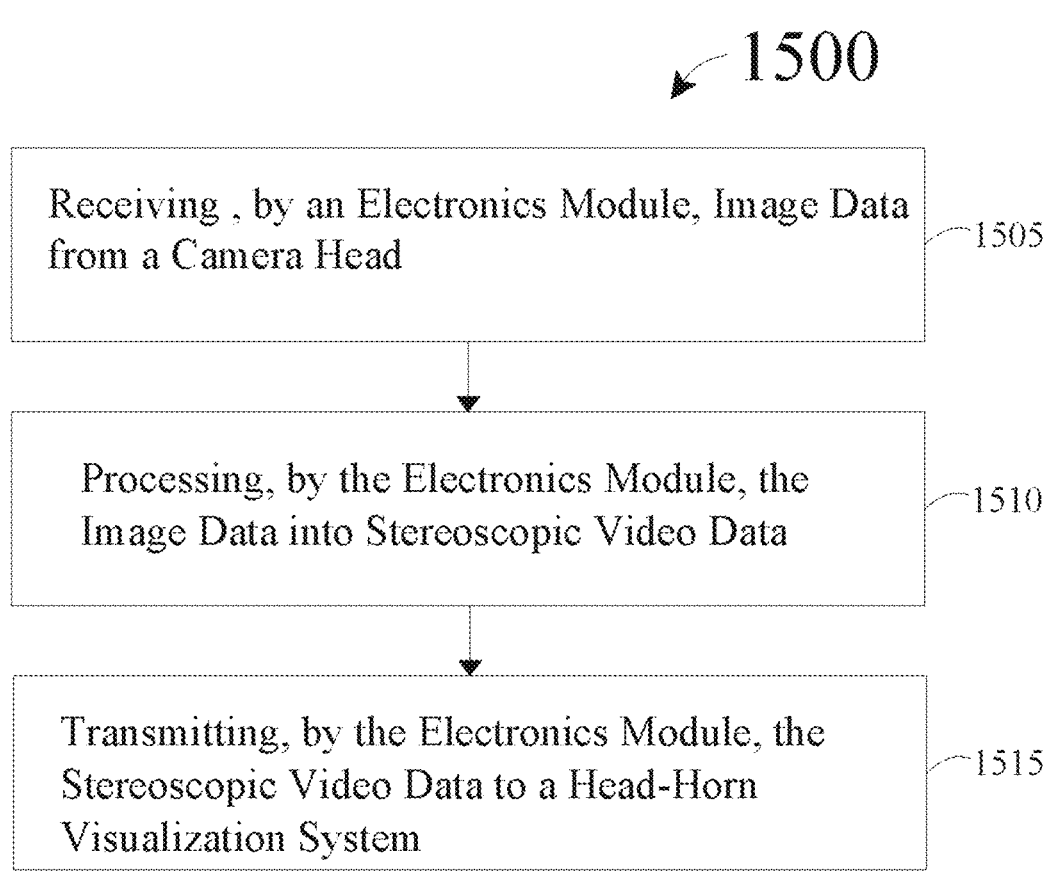
FIG. 15 illustrates an exemplary flow diagram of a method for maneuverable stereoscopic field of view.

Referring now to FIG. 15, an exemplary flow diagram of a method 1500 for maneuverable stereoscopic field of view. At step 1505, method 1500 includes receiving, by an electronics module, image data from a camera head, for example, and as implemented in reference to FIGS. 1-14. At step 1510, method 1500 includes processing, by the electronics module, the image data to output stereoscopic video data, for example and as implemented in reference to FIGS. 1-14. At step 1515, method 1500 includes transmitting, by the electronics module, the stereoscopic video data to a head-horn visualization system, for example, and as implemented in reference to FIGS. 1-14. In some embodiments, processing the image data may include utilizing a digital rotation software function, a digital image height adjustment function, and/or a digital screen adjustment function.

Figure 16:
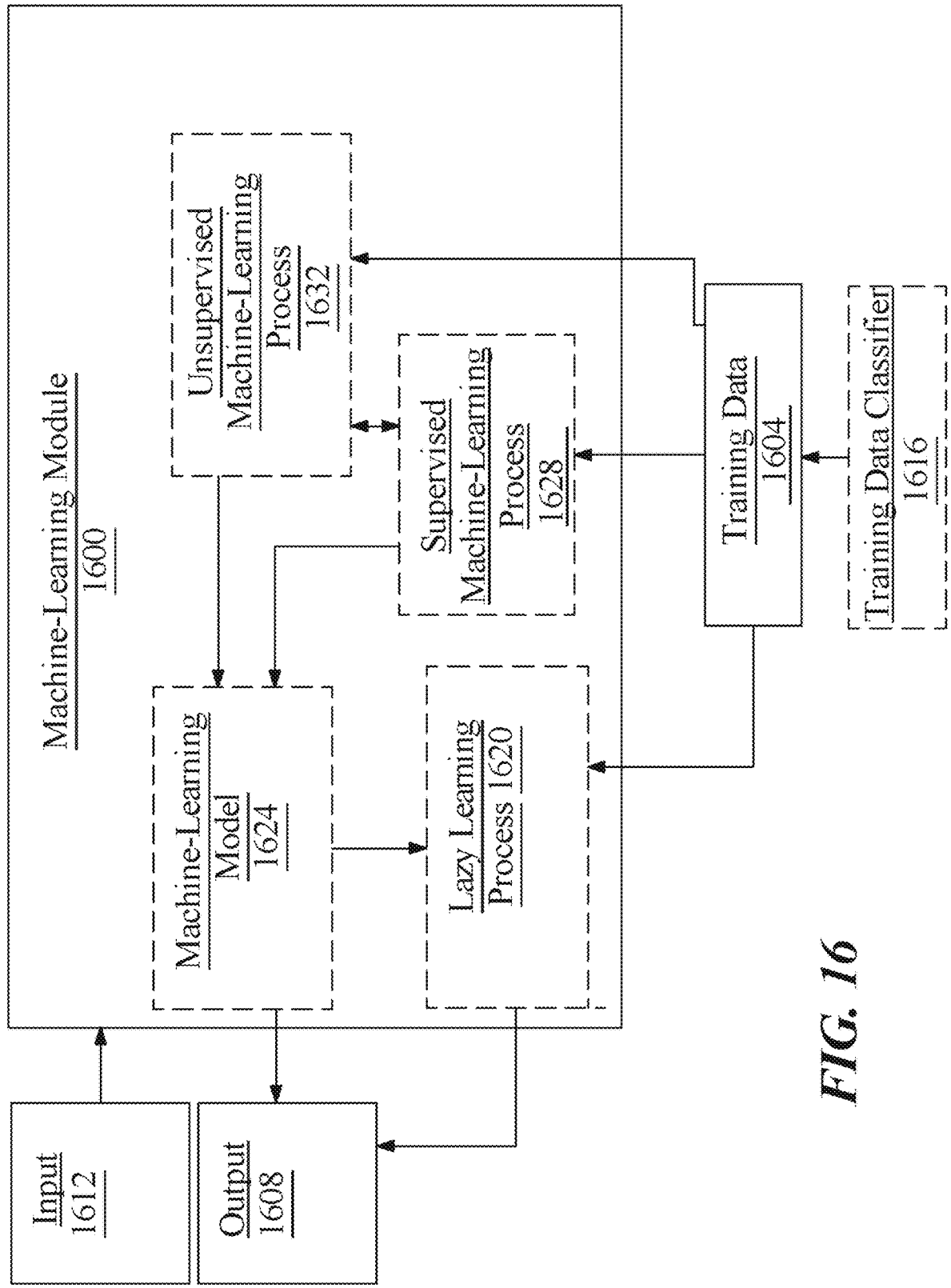
FIG. 16 illustrates a machine-learning module.

Referring now to FIG. 16, an exemplary embodiment of a machine-learning module 1600 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 1604 to generate an algorithm that will be performed by a computing device/module to produce outputs 1608 given data provided as inputs 1612; this is in contrast to a non-machine learning software program where the commands to be executed are determined in advance by a user and written in a programming language.

Still referring to FIG. 16, "training data," as used herein, is data containing correlations that a machine-learning process may use to model relationships between two or more categories of data elements. For instance, and without limitation, training data 1604 may include a plurality of data entries, each entry representing a set of data elements that were recorded, received, and/or generated together; data elements may be correlated by shared existence in a given data entry, by proximity in a given data entry, or the like. Multiple data entries in training data 1604 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1604 according to various correlations; correlations may indicate causative and/or predictive links between categories of data elements, which may be modeled as relationships such as mathematical relationships by machine-learning processes as described in further detail below. Training data 1604 may be formatted and/or organized by categories of data elements, for instance by associating data elements with one or more descriptors corresponding to categories of data elements. As a non-limiting example, training data 1604 may include data entered in standardized forms by persons or processes, such that entry of a given data element in a given field in a form may be mapped to one or more descriptors of categories. Elements in training data 1604 may be linked to descriptors of categories by tags, tokens, or other data elements; for instance, and without limitation, training data 1604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 16, training data 1604 may include one or more elements that are not categorized; that is, training data 1604 may not be formatted or contain descriptors for some elements of data. Machine-learning algorithms and/or other processes may sort training data 1604 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1604 to be made applicable for two or more distinct machine-learning algorithms as described in further detail below. Training data 1604 used by machine-learning module 1600 may correlate any input data as described in this disclosure to any output data as described in this disclosure.

Further referring to FIG. 16, training data may be filtered, sorted, and/or selected using one or more supervised and/or unsupervised machine-learning processes and/or models as described in further detail below; such models may include without limitation a training data classifier 1616. Training data classifier 1616 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 1600 may generate a classifier using a classification algorithm, defined as a processes whereby a computing device and/or any module and/or component operating thereon derives a classifier from training data 1604. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 16, machine-learning module 1600 may be configured to perform a lazy-learning process 1620 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1604. Heuristic may include selecting some number of highest-ranking associations and/or training data 1604 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 16, machine-learning processes as described in this disclosure may be used to generate machine-learning models 1624. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 1624 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1624 may be generated by creating an artificial neural network, such as a convolutional neural network comprising an input layer of nodes, one or more intermediate layers, and an output layer of nodes. Connections between nodes may be created via the process of "training" the network, in which elements from a training data 1604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 16, machine-learning algorithms may include at least a supervised machine-learning process 1628. At least a supervised machine-learning process 1628, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1604. Persons skilled in the art, upon reviewing the entirety of this disclosure, will be aware of various possible variations of at least a supervised machine-learning process 1628 that may be used to determine relation between inputs and outputs. Supervised machine-learning processes may include classification algorithms as defined above.

Further referring to FIG. 16, machine learning processes may include at least an unsupervised machine-learning processes 1632. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 16, machine-learning module 1600 may be designed and configured to create a machine-learning model 1624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 16, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 17:
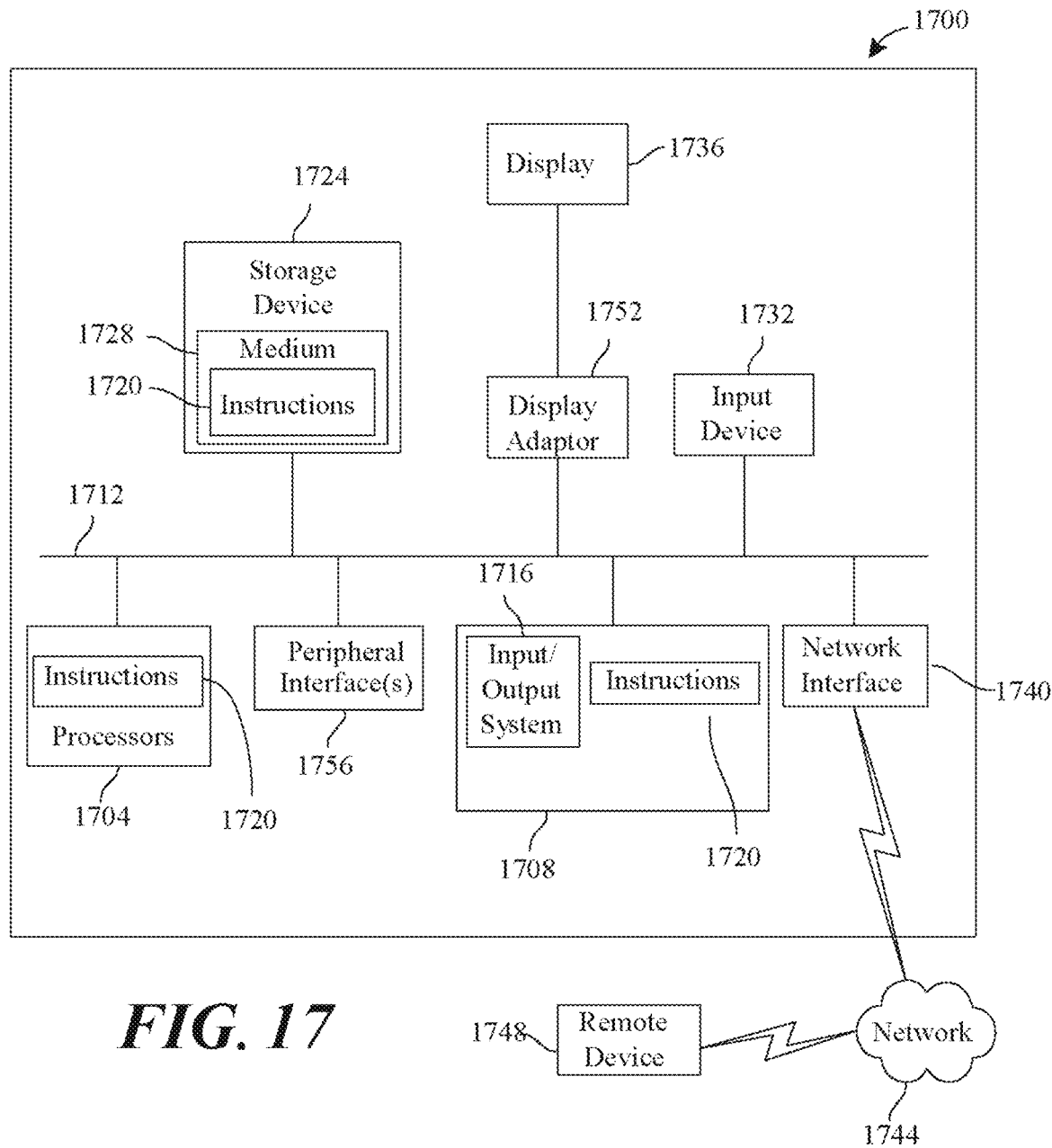
FIG. 17 is a block diagram of a computing system that can be used to implement any one or more of the methodologies disclosed herein and any one or more portions thereof.

FIG. 17 shows a diagrammatic representation of one embodiment of a computing device in the exemplary form of a computer system 1700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1700 includes a processor 1704 and a memory 1708 that communicate with each other, and with other components, via a bus 1712. Bus 1712 may include any of several types of bus structures including, but not limited to, a memory bus, a memory controller, a peripheral bus, a local bus, and any combinations thereof, using any of a variety of bus architectures.

Processor 1704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1704 may be organized according to Von Neumann and/or Harvard architecture as a non-limiting example. Processor 1704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 1708 may include various components (e.g., machine-readable media) including, but not limited to, a random-access memory component, a read only component, and any combinations thereof. In one example, a basic input/output system 1716 (BIOS), including basic routines that help to transfer information between elements within computer system 1700, such as during start-up, may be stored in memory 1708. Memory 1708 may also include (e.g., stored on one or more machine-readable media) instructions (e.g., software) 1720 embodying any one or more of the aspects and/or methodologies of the present disclosure. In another example, memory 1708 may further include any number of program modules including, but not limited to, an operating system, one or more application programs, other program modules, program data, and any combinations thereof.

Computer system 1700 may also include a storage device 1724. Examples of a storage device (e.g., storage device 1724) include, but are not limited to, a hard disk drive, a magnetic disk drive, an optical disc drive in combination with an optical medium, a solid-state memory device, and any combinations thereof. Storage device 1724 may be connected to bus 1712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1724 (or one or more components thereof) may be removably interfaced with computer system 1700 (e.g., via an external port connector (not shown)). Particularly, storage device 1724 and an associated machine-readable medium 1728 may provide nonvolatile and/or volatile storage of machine-readable instructions, data structures, program modules, and/or other data for computer system 1700. In one example, software 1720 may reside, completely or partially, within machine-readable medium 1728. In another example, software 1720 may reside, completely or partially, within processor 1704.

Computer system 1700 may also include an input device 1732. In one example, a user of computer system 1700 may enter commands and/or other information into computer system 1700 via input device 1732. Examples of an input device 1732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1732 may be interfaced to bus 1712 via any of a variety of interfaces (not shown) including, but not limited to, a serial interface, a parallel interface, a game port, a USB interface, a FIREWIRE interface, a direct interface to bus 1712, and any combinations thereof. Input device 1732 may include a touch screen interface that may be a part of or separate from display 1736, discussed further below. Input device 1732 may be utilized as a user selection device for selecting one or more graphical representations in a graphical interface as described above.

A user may also input commands and/or other information to computer system 1700 via storage device 1724 (e.g., a removable disk drive, a flash drive, etc.) and/or network interface device 1740. A network interface device, such as network interface device 1740, may be utilized for connecting computer system 1700 to one or more of a variety of networks, such as network 1744, and one or more remote devices 1748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1744, may employ a wired and/or a wireless mode of communication. In general, any network topology may be used. Information (e.g., data, software 1720, etc.) may be communicated to and/or from computer system 1700 via network interface device 1740.

Computer system 1700 may further include a video display adapter 1752 for communicating a displayable image to a display device, such as display device 1736. Examples of a display device include, but are not limited to, a liquid crystal display (LCD), a cathode ray tube (CRT), a plasma display, a light emitting diode (LED) display, and any combinations thereof. Display adapter 1752 and display device 1736 may be utilized in combination with processor 1704 to provide graphical representations of aspects of the present disclosure. In addition to a display device, computer system 1700 may include one or more other peripheral output devices including, but not limited to, an audio speaker, a printer, and any combinations thereof. Such peripheral output devices may be connected to bus 1712 via a peripheral interface 1756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatuses, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus to enable maneuverable stereoscopic field of view,
the apparatus comprising:
an articulating arm configured to be maneuverable with respect the field of view;
a camera head including a first and a second camera, the first and the second camera configured to respectively capture first image data and second image data, the camera head mounted on the articulating arm;
an electronics module connected to the camera head, the electronics module comprising;
a processor; and
a memory communicatively connected to the processor, wherein the memory contains instructions that, when executed by the processor, causes the processor to:
receive the first image data and the second image data from the first camera and the second camera of the camera head;
process the first image data to form a first sub-image and process the second image data to form a second sub-image;
utilize a digital image height adjustment function that crops different portions of the first and second sub-images of the first image data and second image data and thereafter vertically shifting the cropped first and second sub-images so that a central axis of the first and second sub-images are colinear and further wherein the processor re-centers the first and second sub-images creating a shared position of the first and second sub-images in the first image data and the second image data so that stereoscopic video data is formed; and
transmit the stereoscopic video data.

2. The apparatus of claim 1, wherein the camera head is attached to the articulating arm by a ball-and-socket joint.

3. The apparatus of claim 1, wherein the camera head further comprises:
an image signal processor board; and
a light source.

4. The apparatus of claim 3, wherein the camera head further comprises a proximal camera head housing configured to allow passthrough of a first image data cable and a second image data cable, wherein the first image data cable and the second image data cable are configured to transmit the image data captured by the camera head to the electronics module.

5. The apparatus of claim 3, wherein the image signal processor board is configured to:
process image data received from the first camera and the second camera; and
format the image data to be transmitted to the electronics module utilizing a first image cable and a second image cable.

6. The apparatus of claim 1, wherein the electronics module further comprises a graphics processing unit.

7. The apparatus of claim 6, wherein the graphics processing unit is configured to manipulate image data for display.

8. The apparatus of claim 1, further comprising a head-worn visualization system communicatively connected to the electronics module.

9. The apparatus of claim 8, wherein the electronics module is further configured to transmit the stereoscopic video data to the head-worn visualization system.

10. The apparatus of claim 8, wherein the head-worn visualization system comprises:
a first glasses cable;
a second glasses cable; and
a plurality of display cable connectors.

11. The apparatus of claim 8, wherein processing the image data comprises utilizing a digital image height adjustment function to vertically shift the sub-images to be displayed on a left display and a right display of the head-worn visualization system such that a central axis of an object displayed on the left display and right display are colinear.

12. The apparatus of claim 1, wherein processing the image data comprises utilizing a digital rotation software function which compensates for mechanical rotational misalignment of the first and second camera by rotating the first or second sub-images until the first and second sub-images line up along a horizontal axis.

13. The apparatus of claim 1, wherein processing the image data comprises utilizing a digital zoom software function.

14. The apparatus of claim 1, wherein processing the image data comprises utilizing a digital screen adjustment function which compensates for vertical misalignment of a first display and second display for the first and second sub-images.

15. The apparatus of claim 1, wherein processing the image data comprises utilizing a digital screen rotation function.

16. A method for enabling maneuverable stereoscopic field of view, the method comprising:
receiving, by an electronics module, image data from a camera head, the camera head including a first and second camera, the first and second camera configured to respectively capture first image data and second image data, the camera head being configured to be maneuverable with respect to the field of view;
processing, by the electronics module, the first and second image data into stereoscopic video data, wherein the electronics module includes a processor and memory coupled to the processor, wherein the memory contains instructions that, when executed by the processor, causes the processor to receive the first image data and the second image data from the first camera and the second camera of the camera head;
process the first image data to form a first sub-image and process the second image data to form a second sub-image;
utilize a digital image height adjustment function that crops different portions of the first and second sub-images of the first image data and second image data and thereafter vertically shifting the cropped first and second sub-images so that a central axis of the first and second sub-images are colinear and further wherein the processor re-centers the first and second sub-images creating a shared position of the first and second sub-images in the first image data and the second image data so that stereoscopic video data is formed; and transmitting, by the electronics module, the stereoscopic video data.

17. The method of claim 16, wherein processing the image data comprises utilizing a digital rotation software function which compensates for mechanical rotational misalignment of the first and second camera by rotating the first or second sub-images until the first and second sub-images line up along a horizontal axis.

18. The method of claim 16, wherein processing the image data comprises utilizing a digital zoom software function.

19. The method of claim 16, wherein processing the image data comprises utilizing a digital screen adjustment function.

20. The method of claim 16, wherein processing the image data comprises vertically shifting the sub-images to be displayed on a left display and a right display of the head-worn visualization system such that a central axis of an object displayed on the left display and right display are colinear.

\* \* \* \* \*